US012374505B2

(12) United States Patent
Aoyama et al.

(10) Patent No.: US 12,374,505 B2
(45) Date of Patent: Jul. 29, 2025

(54) ELECTROLYTIC CAPACITOR

(71) Applicant: Panasonic Intellectual Property Management Co., Ltd., Osaka (JP)

(72) Inventors: Kazuaki Aoyama, Osaka (JP); Junichi Kurita, Osaka (JP); Kenta Sato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 144 days.

(21) Appl. No.: 17/905,637

(22) PCT Filed: Mar. 18, 2021

(86) PCT No.: PCT/JP2021/011000
§ 371 (c)(1),
(2) Date: Sep. 5, 2022

(87) PCT Pub. No.: WO2021/200197
PCT Pub. Date: Oct. 7, 2021

(65) Prior Publication Data
US 2023/0119189 A1    Apr. 20, 2023

(30) Foreign Application Priority Data

Mar. 31, 2020  (JP) ................................. 2020-064791
Oct. 30, 2020  (JP) ................................. 2020-183105

(51) Int. Cl.
*H01G 9/15*     (2006.01)
*H01G 9/012*    (2006.01)
(Continued)

(52) U.S. Cl.
CPC ............... *H01G 9/15* (2013.01); *H01G 9/012* (2013.01); *H01G 9/042* (2013.01); *H01G 9/048* (2013.01); *H01G 9/10* (2013.01)

(58) Field of Classification Search
CPC ............ H01G 9/15; H01G 9/10; H01G 9/048; H01G 9/042; H01G 9/012
See application file for complete search history.

(56) References Cited

U.S. PATENT DOCUMENTS 5,184,287 A * 2/1993 Taniguchi ............... H01G 9/012
                                                           363/45
5,880,925 A * 3/1999 DuPre ...................... H01G 2/065
                                                         361/308.1
(Continued)

FOREIGN PATENT DOCUMENTS

JP         58030121 A  *  2/1983
JP         11-288846       10/1999
(Continued)

OTHER PUBLICATIONS

International Search Report of PCT application No. PCT/JP2021/011000 dated Jun. 1, 2021.

*Primary Examiner* — David M Sinclair
(74) *Attorney, Agent, or Firm* — Rimon P.C.

(57) ABSTRACT

An electrolytic capacitor includes a capacitor element, an exterior body, a first external electrode, and a second external electrode. The capacitor element includes an anode body that is electrically connected to the first external electrode and has a porous part on a surface thereof, a dielectric layer that is disposed on a surface of at least a part of the porous part, and a solid electrolyte layer that covers at least a part of the dielectric layer, and is electrically connected to the second external electrode. The exterior body has a first principal surface, a second principal surface intersecting the first principal surface, a third principal surface opposite to the first principal surface, and a fourth principal surface opposite to the second principal surface. The first external (Continued)

electrode and the second external electrode are disposed along the first principal surface of the exterior body to be separated from each other.

13 Claims, 15 Drawing Sheets

(51) Int. Cl.
*H01G 9/042* (2006.01)
*H01G 9/048* (2006.01)
*H01G 9/10* (2006.01)

(56) References Cited

U.S. PATENT DOCUMENTS

| | | |
|---|---|---|
| 6,185,091 B1 | 2/2001 | Tanahashi et al. |
| 6,292,350 B1 * | 9/2001 | Naito ............... H01G 4/30 |
| | | 361/308.1 |
| 9,607,763 B2 * | 3/2017 | Sasabayashi ....... H01G 4/0085 |
| 2003/0026058 A1 * | 2/2003 | Greenwood ........ H01G 9/15 |
| | | 361/301.4 |
| 2003/0103320 A1 | 6/2003 | Shimada et al. |
| 2006/0018081 A1 * | 1/2006 | Hwa Lee ............ H01G 4/012 |
| | | 361/321.2 |
| 2006/0120023 A1 | 6/2006 | Kobayashi et al. |
| 2007/0121275 A1 | 5/2007 | Takashima et al. |
| 2007/0279836 A1 | 12/2007 | Takashima et al. |
| 2009/0086403 A1 * | 4/2009 | Lee ................... H01G 4/232 |
| | | 361/301.4 |
| 2009/0154067 A1 | 6/2009 | Kurita et al. |
| 2010/0214038 A1 | 8/2010 | Kurita et al. |
| 2015/0077905 A1 * | 3/2015 | Shin .................. H05K 1/181 |
| | | 361/529 |
| 2015/0325379 A1 * | 11/2015 | Park .................. H01G 9/012 |
| | | 29/25.03 |
| 2017/0040117 A1 * | 2/2017 | Shin .................. H05K 1/181 |

FOREIGN PATENT DOCUMENTS

| | | |
|---|---|---|
| JP | 2003-178933 | 6/2003 |
| JP | 2004095816 A * | 3/2004 |
| JP | 2006-203168 | 8/2006 |
| JP | 2008021773 A * | 1/2008 |
| JP | 2008-078370 | 4/2008 |
| JP | 2009-123938 | 6/2009 |
| WO | 2003/107366 | 12/2003 |

* cited by examiner

FIG. 9

| | ANODE FOIL | CATHODE FOIL |
|---|---|---|
| CONFIGURATION EXAMPLE 10 | | |
| CONFIGURATION EXAMPLE 11 | | |

| | ANODE FOIL | CATHODE FOIL |
|---|---|---|
| CONFIGURATION EXAMPLE 12 |  |  |
| CONFIGURATION EXAMPLE 13 |  |  |

| | ANODE FOIL | CATHODE FOIL |
|---|---|---|
| CONFIGURATION EXAMPLE 14 |  |  |
| CONFIGURATION EXAMPLE 15 |  |  |

# ELECTROLYTIC CAPACITOR

TECHNICAL FIELD

The present disclosure relates to an electrolytic capacitor.

BACKGROUND

An electrolytic capacitor includes a capacitor element, an exterior body that seals the capacitor element, and external electrodes electrically connected to an anode and a cathode of the capacitor element, respectively. The capacitor element includes an anode body having a first part (also referred to as an anode lead-out part) including a first end of the anode body and a second part (also referred to as a cathode formation part) including a second end of the anode body, a dielectric layer formed on a surface of at least the second art of the anode body, and a cathode part covering at least a part of the dielectric layer.

Unexamined Japanese Patent Publication No. 2008-78370 proposes a solid electrolytic capacitor including an element stacked body in which flat plate-shaped capacitor elements each having an anode electrode part and a cathode electrode part are stacked in even units such that a plurality of the anode electrode parts are alternately disposed in opposite directions. The solid electrolytic capacitor of Unexamined Japanese Patent Publication No. 2008-78370 further includes a pair of anode common terminals joined so as to integrally combine the anode electrode parts positioned at both ends of the element stacked body, a cathode common terminal joined to a lower surface of the cathode electrode part positioned at a center of the element stacked body, a pair of anode terminals respectively disposed on lower surfaces of the pair of anode common terminals, and a pair of cathode terminals joined to the cathode common terminal. The pair of anode terminals are connected by a plate-shaped inductor part, and the pair of cathode terminals are respectively joined to both ends of the lower surface of the cathode common terminal in a direction intersecting the inductor part. Unexamined Japanese Patent Publication No. 2008-78370 proposes lowering of the equivalent series inductance (ESL) of an electrolytic capacitor with this configuration.

SUMMARY

An electrolytic capacitor according to one aspect of the present disclosure includes a capacitor element, an exterior body that seals the capacitor element, a first external electrode, and a second external electrode. The capacitor element includes an anode body that is electrically connected to the first external electrode and has a porous part on a surface, a dielectric layer that is formed on a surface of at least a part of the porous part, and a solid electrolyte layer that covers at least a part of the dielectric layer, and is electrically connected to the second external electrode. The exterior body has a first principal surface, a second principal surface intersecting the first principal surface, a third principal surface opposite to the first principal surface, and a fourth principal surface opposite to the second principal surface. The first external electrode and the second external electrode are disposed along the first principal surface of the exterior body to be separated from each other.

The present disclosure enables the electrolytic capacitor to have high capacitance while maintaining a low ESL.

BRIEF DESCRIPTION OF THE DRAWINGS

FIG. 9 is a table representing an example of the combination of the anode foil and the cathode foil used in the electrolytic capacitor according to the first exemplary embodiment of the present disclosure.

DESCRIPTION OF EMBODIMENT

Figure 1:
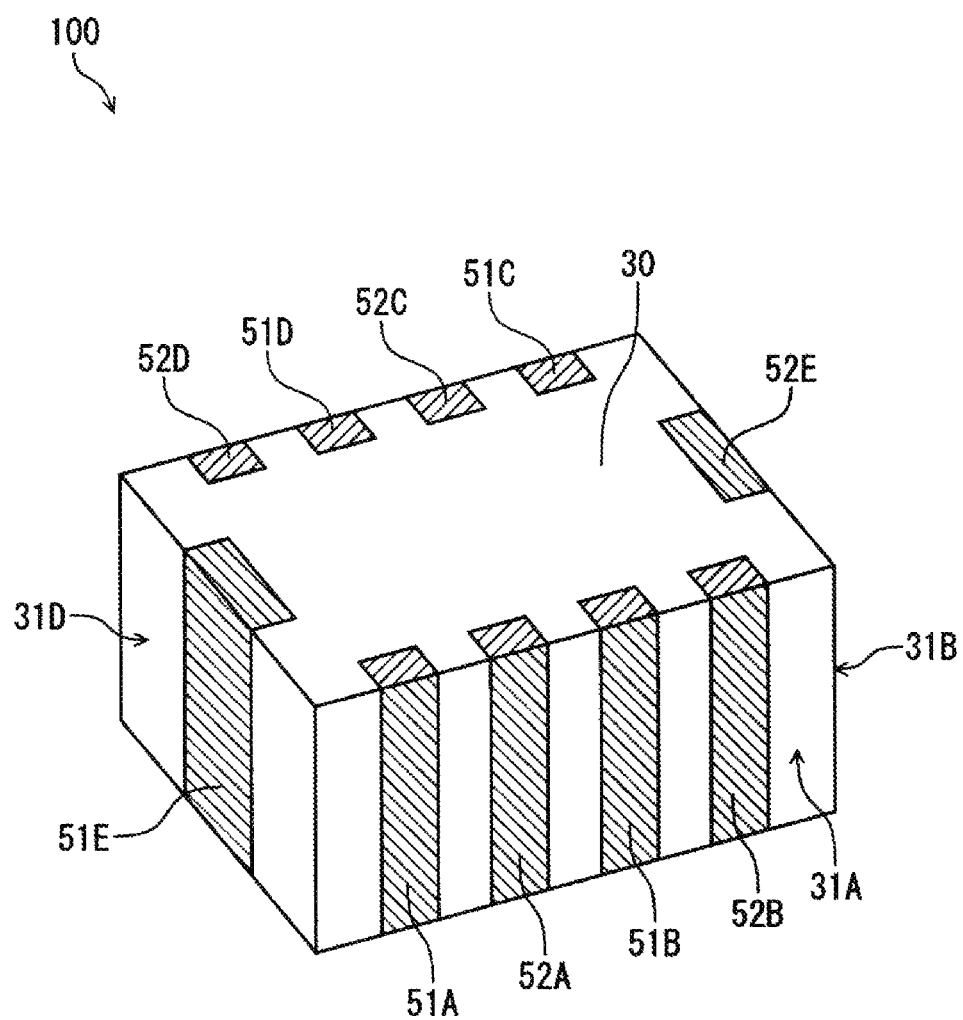
FIG. 1 is a perspective view schematically illustrating an electrolytic capacitor according to a first exemplary embodiment of the present disclosure.

Prior to the description of exemplary embodiments, a problem in the prior art will be briefly described below.

The solid electrolytic capacitor in the prior art, in which the anode electrode parts and the external electrodes are electrically connected via the anode common terminals, is limited in space to be occupied by the capacitor elements because of the space occupied by the anode common terminals. Thus, it is difficult to increase the capacitance of the capacitor.

In view of the above problems, the present disclosure provides an electrolytic capacitor capable of achieving high capacitance while maintaining a low ESL.

[Electrolytic Capacitor]

An electrolytic capacitor according to the present exemplary embodiment includes capacitor elements, an exterior body that seals the capacitor elements, a first external electrode, and a second external electrode. The capacitor element includes an anode body electrically connected to the first external electrode (anode electrode) and having a porous part on a surface thereof, a dielectric layer disposed on at least a part of a surface of the porous part, and a solid electrolyte layer covering at least a part of the dielectric layer. The solid electrolyte layer is electrically connected to the second external electrode (cathode electrode) via a cathode layer (for example, cathode foil). The anode body has a flat shape having two principal surfaces as a whole.

The exterior body may have, for example, four principal surfaces intersecting the principal surfaces of the anode body. When an outer shape of the exterior body is a rectangular parallelepiped, normally, the four principal surfaces are surfaces substantially perpendicular to the principal surfaces of the anode body. One of the four principal surfaces is a first principal surface. In addition to the first principal surface, the four principal surfaces may include a second principal surface intersecting the first principal surface, a third principal surface opposite to the first principal surface, and a fourth principal surface opposite to the second principal surface. An end surface of the anode body may be exposed at least on the first principal surface among the first to fourth principal surfaces. The first external electrode may be electrically connected to the exposed end surface of the anode body.

The first external electrode and the second external electrode are disposed at least along the first principal surface to be separated from each other. That is, the anode body and the cathode layer are led out from the first principal surface, and are electrically connected to the first external electrode and the second external electrode, respectively. As a result, the separation distance between the first external electrode and the second external electrode can be shortened so that the ESL is reduced as compared with the conventional configuration in which the first external electrode and the second external electrode are respectively disposed on the principal surfaces opposite to each other.

A plurality of first external electrodes may be provided. In this case, at least two first external electrodes among the plurality of first external electrodes are disposed along the first principal surface of the exterior body to be separated from each other. Similarly, a plurality of second external electrodes may be provided. By providing the plurality of first external electrodes that are separated from each other and/or the plurality of second external electrodes that are separated from each other, the ESL of the electrolytic capacitor can be further reduced.

The second external electrode may be interposed between the two first external electrodes disposed along the first principal surface of the exterior body to be separated from each other. As a result, the ESL of the electrolytic capacitor is further reduced.

When a plurality of the first external electrodes are provided, at least one of the plurality of first external electrodes may be disposed along the second principal surface. Further, at least one of the plurality of first external electrodes may be disposed along the third principal surface or the fourth principal surface.

A plurality of the first external electrodes and a plurality of the second external electrodes may be provided. In this case, at least one of the plurality of first external electrodes and at least one of the plurality of second external electrodes may be disposed along the first principal surface of the exterior body to be separated from each other. And the remaining electrodes among the plurality of first external electrodes and the plurality of second external electrodes may be disposed along any one of the second to fourth principal surfaces of the exterior body to be separated from each other. At least a remaining one of the plurality of first external electrodes and at least a remaining one of the plurality of second external electrodes may be disposed along the third principal surface of the exterior body to be separated from each other.

At least one of the plurality of first external electrodes may be disposed along the second principal surface, and at least one of the plurality of second external electrodes may be disposed along the fourth principal surface. At least one of the plurality of first external electrodes and at least one of the plurality of second external electrodes may be disposed along the second principal surface.

A distance between the first principal surface and the third principal surface may be longer or shorter than a distance between the second principal surface and the fourth principal surface.

When the distance between the first principal surface and the third principal surface is longer than the distance between the second principal surface and the fourth principal surface, the first principal surface and the third principal surface correspond to short sides of a contour line of a substantially rectangular exterior body, and the second principal surface and the fourth principal surface correspond to long sides of the contour line of the substantially rectangular exterior body in viewing the electrolytic capacitor from the direction perpendicular to the principal surface of the anode body. In this case, at least one first external electrode and at least one second external electrode may be disposed on the first principal surface that corresponds to the short side. When a plurality of the first external electrodes and a plurality of the second external electrodes are provided, at least a remaining one of the plurality of first external electrodes and at least a remaining one of the plurality of second external electrodes may be disposed on the third principal surface that is opposite to the first principal surface and also corresponds to the short side.

The anode body has, for example, a first region covered with the solid electrolyte layer and a second region protruding from the first region. At least a part of second region is not covered with the solid electrolyte layer. The second region corresponds to an anode lead-out part. The protruding second region is electrically connected to the first external electrode, and thus, the first external electrode is disposed along the first principal surface (or the second to fourth principal surfaces). In this case, in the anode body, an end surface of the second region may be exposed on the first principal surface (or the second to fourth principal surfaces) of the exterior body, and the anode body may be electrically connected to the first external electrode on the exposed end surface of the second region of the anode body. A thickness in a height direction of the porous part in the protruding second region may be smaller than a thickness in a height direction of the porous part in the first region covered with the solid electrolyte layer. For example, the thickness in the height direction may be reduced by pressing or laser irradiation in a part of the porous part in the protruding second region. In the porous part in the protruding second region, it is preferable to reduce a thickness in a height direction of a portion electrically connected to the first external electrode. Alternatively, the protruding second region may include only a core having no porous part on a surface.

Meanwhile, in order to electrically connect the second external electrode and the solid electrolyte layer, the cathode foil electrically connected to the solid electrolyte layer may be provided, and the cathode foil may be electrically connected to the second external electrode. The cathode foil has, for example, a third region facing the solid electrolyte layer and a fourth region protruding from the third region. The fourth region corresponds to a cathode lead-out part. The protruding fourth region is electrically connected to the second external electrode, and thus, the second external electrode is formed along the first principal surface (or the second to fourth principal surfaces). In this case, in the cathode foil, an end surface of the fourth region may be exposed on the first principal surface (or the second to fourth principal surfaces) of the exterior body, and the cathode foil may be electrically connected to the second external electrode on the exposed end surface of the fourth region of the cathode foil.

The electrolytic capacitor may include a plurality of the capacitor elements. In this case, the electrolytic capacitor includes an element stacked body in which capacitor elements are stacked. In the element stacked body, the cathode foil is interposed between the capacitor elements adjacent to each other. The plurality of capacitor elements may include at least one first capacitor element and/or the second capacitor element to be defined below.

In the first capacitor element, the anode body is electrically connected to the first external electrode on at least one of the first principal surface or the third principal surface of the exterior body. Meanwhile, in the first capacitor element, the cathode foil is electrically connected to the second external electrode on at least one of the first principal surface or the third principal surface.

In the second capacitor element, the anode body is electrically connected to the first external electrode on only any one of the first principal surface and the third principal surface of the exterior body. Meanwhile, in the second capacitor element, the cathode foil is electrically connected to the second external electrode on only any one of the first principal surface and the third principal surface.

The electrolytic capacitor can be formed by using the element stacked body in which the first capacitor element and the second capacitor element are alternately stacked.

For example, it is possible to use, as the first capacitor element, the capacitor element in which the anode body is electrically connected to the first external electrode on only the first principal surface among the first principal surface and the third principal surface of the exterior body, and it is possible to use, as the second capacitor element, the capacitor element in which the anode body is electrically connected to the first external electrode on only the third principal surface among the first principal surface and the third principal surface of the exterior body. In this case, when the first capacitor element and the second capacitor element are alternately stacked, since the first principal surface and the third principal surface are surfaces of the exterior body facing each other, a direction of a current flowing through the anode body may be opposite between the first capacitor element and the second capacitor element. Consequently, a magnetic flux generated in the element stacked body decreases since a direction of a magnetic field generated by the current flowing through the anode body is different. As a result, the ESL of the electrolytic capacitor can be further reduced.

In the above description, a case where the anode body is electrically connected to the external electrode on only the first principal surface (third principal surface) among the first principal surface and the third principal surface means a case where the anode body is electrically connected to the external electrode on any one of the first principal surface and the third principal surface and is not electrically connected to the external electrode on the other. As will be described later, a case where the anode body is electrically connected to the external electrode on the second principal surface and/or the fourth principal surface is not excluded.

In this case, the cathode foil in the first capacitor element may be electrically connected to the second external electrode on any one of the first principal surface and the third principal surface. The cathode foil in the second capacitor element may be electrically connected to the second external electrode on an opposite side of the first capacitor element. That is, the cathode foil in the second capacitor element may be electrically connected to the second external electrode on the third principal surface when the cathode foil in the first capacitor element is electrically connected to the second external electrode on the first principal surface, or may be electrically connected to the second external electrode on the first principal surface when the cathode foil in the first capacitor element is electrically connected to the second external electrode on the third principal surface. In this case, when the first capacitor element and the second capacitor element are alternately stacked, a direction of a current flowing through the cathode foil may be opposite between the first capacitor element and the second capacitor element. Consequently, a magnetic flux generated in the element stacked body decreases since a direction of a magnetic field generated by the current flowing through the cathode foil is different. As a result, the ESL of the electrolytic capacitor can be further reduced.

In the first capacitor element, the anode body may be electrically connected to the first external electrode on only the first principal surface among the first principal surface and the third principal surface of the exterior body, and the cathode foil may be electrically connected to the second external electrode on only the third principal surface among the first principal surface and the third principal surface of the exterior body. In the second capacitor element, the anode body may be electrically connected to the first external electrode on only the third principal surface among the first principal surface and the third principal surface of the exterior body, and the cathode foil may be electrically connected to the second external electrode on only the first principal surface among the first principal surface and the third principal surface of the exterior body. In this case, when the first capacitor element and the second capacitor element are alternately stacked, since the current flowing through the capacitor element is opposite to the current flowing through the first capacitor element and the second capacitor element, the magnetic field generated by the current flowing through the capacitor element is effectively canceled, and an effect of reducing ESL is remarkable.

The first external electrode may be disposed along the second principal surface and/or the fourth principal surface of the exterior body. In this case, the capacitor element in which the anode body is electrically connected to the first external electrode on one of the second principal surface and the fourth principal surface of the exterior body may be used as the first capacitor element, and the capacitor element in which the anode body is electrically connected to the first external electrode on the other of the second principal surface and the fourth principal surface of the exterior body may be used as the second capacitor element. In this case, when the first capacitor element and the second capacitor element are alternately stacked, since the second principal surface and the fourth principal surface are surfaces of the exterior body facing each other, the direction of the current flowing through the anode body may be opposite between the first capacitor element and the second capacitor element. Consequently, a magnetic flux generated in the element stacked body decreases since a direction of a magnetic field generated by the current flowing through the anode body is different. As a result, the ESL of the electrolytic capacitor can be further reduced.

Similarly, the second external electrode may be disposed along the second principal surface and/or the fourth principal surface of the exterior body. In this case, the capacitor element in which the cathode foil is electrically connected to the second external electrode on one of the second principal surface and the fourth principal surface of the exterior body may be used as the first capacitor element, and the capacitor element in which the cathode foil is electrically connected to the second external electrode on the other of the second principal surface and the fourth principal surface of the exterior body may be used as the second capacitor element. In this case, when the first capacitor element and the second capacitor element are alternately stacked, since the second principal surface and the fourth principal surface are surfaces of the exterior body facing each other, the direction of the current flowing through the cathode foil may be opposite between the first capacitor element and the second capacitor element. Consequently, a magnetic flux generated in the element stacked body decreases since a direction of a magnetic field generated by the current flowing through the cathode foil is different. As a result, the ESL of the electrolytic capacitor can be further reduced.

In the first capacitor element, the anode body may be electrically connected to the first external electrode on only the second principal surface among the second principal surface and the fourth principal surface of the exterior body, and the cathode foil may be electrically connected to the second external electrode on only the fourth principal surface among the second principal surface and the fourth principal surface of the exterior body. In the second capacitor element, the anode body may be electrically connected to the first external electrode on only the fourth principal surface among the second principal surface and the fourth principal surface of the exterior body, and the cathode foil may be electrically connected to the second external electrode on only the second principal surface among the second principal surface and the fourth principal surface of the exterior body. In this case, when the first capacitor element and the second capacitor element are alternately stacked, since the current flowing through the capacitor element is opposite between the first capacitor element and the second capacitor element, the magnetic field generated by the current flowing through the capacitor element is effectively canceled, and the effect of reducing ESL is remarkable.

As described above, the first capacitor element and the second capacitor element having different electrical connection portions with the first external electrode and/or the second external electrode are alternately stacked, and thus, the magnetic flux generated in the element stacked body may be effectively reduced. Thus, the ESL of the electrolytic capacitor may be reduced effectively. The number of first capacitors and the number of second capacitors may be the same. When the number of first capacitors is equal to the number of second capacitors, the magnetic field generated by the current flowing through the anode body of the first capacitor element and the magnetic field generated by the current flowing through the anode body of the second capacitor element cancel each other without overs or shorts, and the magnetic flux generated in the element stacked body decreases. Thus, the ESL of the electrolytic capacitor is easily reduced.

In the electrolytic capacitor of the present exemplary embodiment, the element stacked body and the external electrode may be electrically connected such that the end surface of the second region of the anode body exposed from the exterior body of each capacitor element is electrically connected to the first external electrode, and the end surface of the fourth region of the cathode foil exposed from the exterior body of each capacitor element is electrically connected to the second external electrode. The above electrical connection between each end surface and the corresponding external electrode may be performed by using an external electrode disposed along the first to fourth principal surfaces of the exterior body or by electrically connecting an intermediate electrode disposed along the first to fourth principal surfaces to the external electrode. In this case, since there is no need to interpose another member for connecting the second region and the fourth region to the external electrodes in the exterior body, the capacitance of the electrolytic capacitor easily increases.

Protrusion lengths of the second region (anode lead-out part) of the anode body and the fourth region (cathode lead-out part) of the cathode foil can be shortened. By shortening the protrusion lengths, ESL caused by a current path flowing through the anode lead-out part and the cathode lead-out part of the element stacked body can be further reduced.

The cathode foil may be, for example, a metal foil, and may be a vapor deposited foil or a coated foil obtained by covering a surface of the metal foil (for example, aluminum (Al) foil or copper (Cu) foil) with a conductive film by vapor deposition or coating. Examples of the conductive film include films made of titanium (Ti), nitride of titanium, carbide of titanium, carbonitride of titanium, oxide of titanium, and carbon (C). A deposited film may be made of nickel. The metal foil may be a plain foil or an etching foil.

The first principal surface and the third principal surface may be surfaces parallel to a longitudinal direction of the exterior body, or may be surfaces parallel to a lateral direction of the exterior body. In terms of reducing the ESL, the first external electrode and the second external electrode may be disposed along a plane parallel to a longitudinal direction of the anode body. That is, in the exterior body, a separation distance between the first principal surface and the third principal surface on which the external electrodes are formed may be shorter than a separation distance between the second principal surface and the fourth principal surface.

Each of the first external electrode and the second external electrode may extend from the corresponding principal surfaces along the bottom surface of the electrolytic capacitor. The first external electrode and/or the second external electrode extend on the bottom surface of the electrolytic capacitor, and thus, an anode terminal and/or a cathode terminal can be disposed on the bottom surface of the electrolytic capacitor. In this case, a current flowing through an extending portion of the first external electrode flows in a direction opposite to the current flowing through the second region (anode lead-out part) electrically connected to the first external electrode. A current flowing through an extending portion of the second external electrode flows in a direction opposite to the fourth region (cathode lead-out part) electrically connected to the second external electrode. As a result, the magnetic field generated by the current flowing through the second region is canceled by a magnetic field generated by the current flowing through the extending portion of the first external electrode, and/or the magnetic field generated by the current flowing through the fourth region is canceled by a magnetic field generated by the current flowing through the extending portion of the second external electrode. The ESL of the electrolytic capacitor may be further reduced.

The ESL is reduced by having a plurality of first external electrodes and/or second external electrodes. When the plurality of first external electrodes are provided, at least two of the plurality of first external electrodes may be separated along the same principal surface of the first to fourth principal surfaces. When a plurality of second external electrodes are provided, at least two of the plurality of second external electrodes may be separated along the same principal surface of the first to fourth principal surfaces. The second external electrode may be interposed between the two first external electrodes disposed along the same principal surface, and/or the first external electrode may be interposed between the two second external electrodes disposed along the same principal surface. In this case, the ESL of the electrolytic capacitor is easily reduced.

The element stacked body is supported on, for example, a substrate, and constitutes the electrolytic capacitor. The substrate is not particularly limited as long as the substrate can electrically separate the first external electrode and the second external electrode. A substrate having a wiring layer formed on a front surface may be used. In this case, the wiring layer may be electrically connected to the solid electrolyte layer. A wiring layer (third external electrode) may also be formed on a back surface of the substrate. The third external electrode may be electrically connected to the wiring layer on the front surface of the substrate via, for example, a via hole. As a result, the third external electrode functions as a cathode terminal of the electrolytic capacitor. The third external electrode may be electrically connected to the second external electrode similarly constituting the cathode terminal.

Hereinafter, an electrolytic capacitor according to the present exemplary embodiment and a method for manufacturing the electrolytic capacitor will be described with reference to the drawings.

First Exemplary Embodiment

Figure 2:
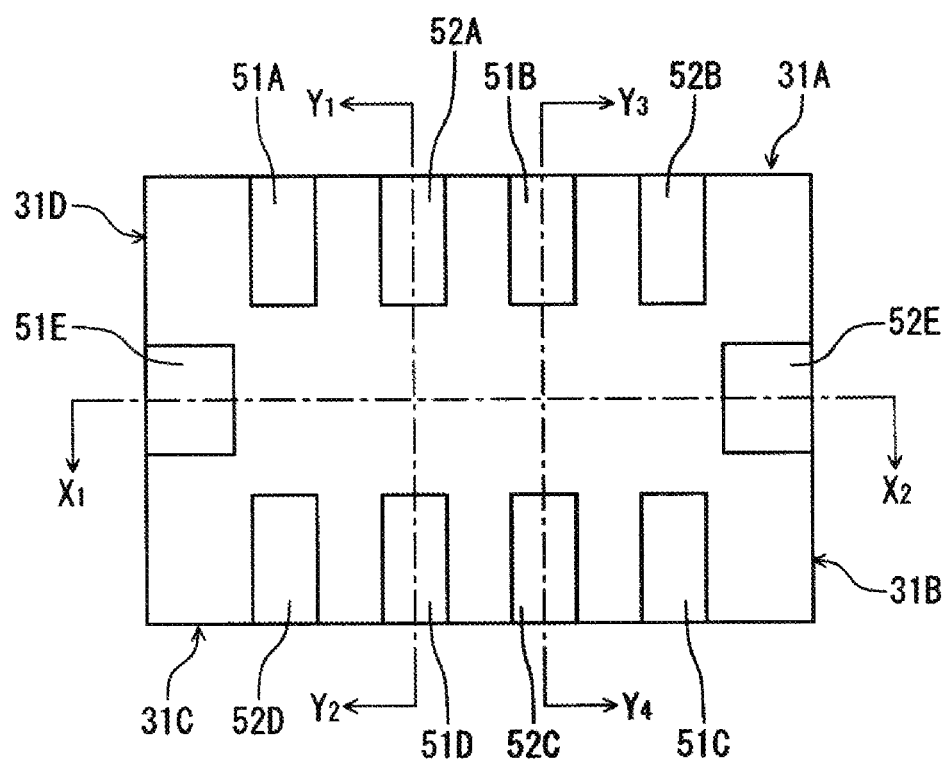
FIG. 2 is a bottom view schematically illustrating the electrolytic capacitor according to the first exemplary embodiment of the present disclosure.
Figure 3A:
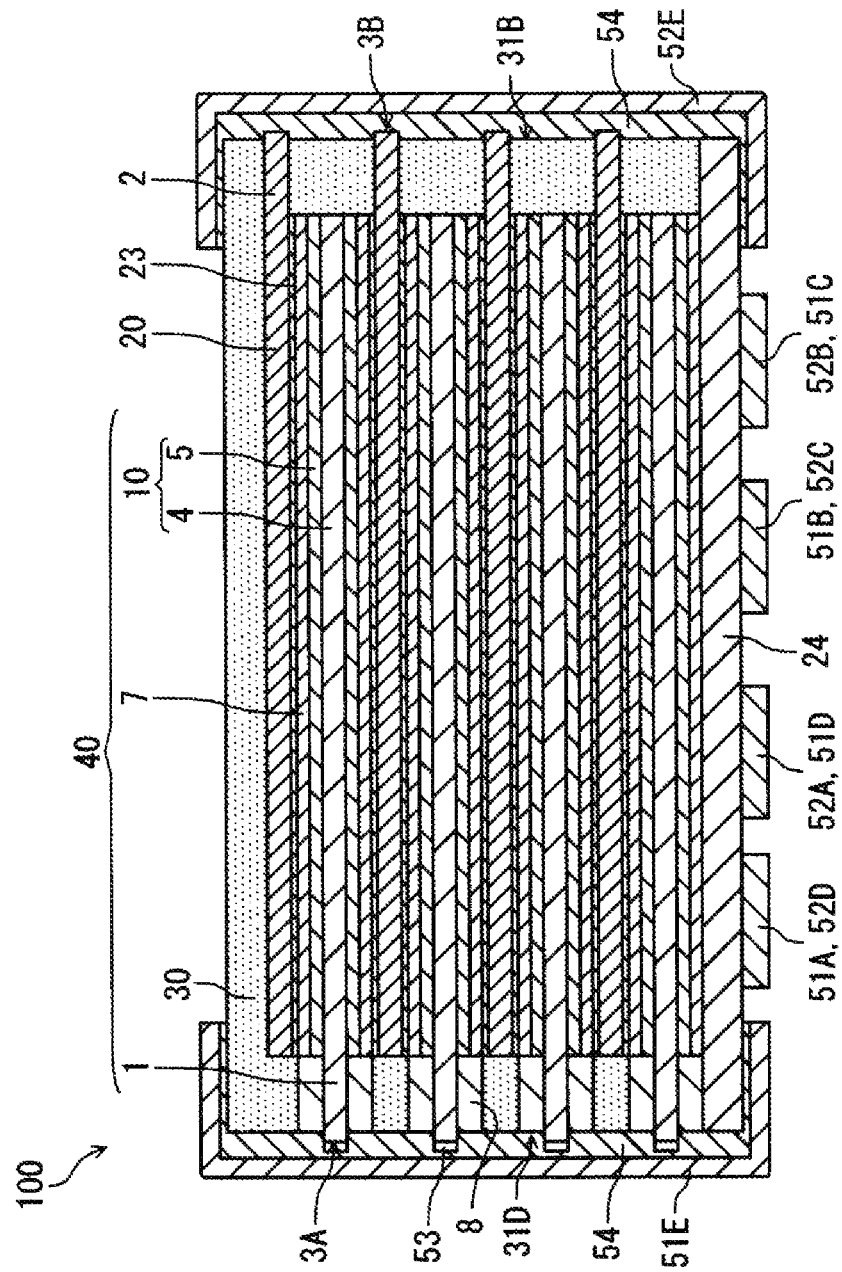
FIG. 3A is a cross-sectional view schematically illustrating a structure of the solid electrolytic capacitor according to the first exemplary embodiment of the present disclosure.
Figure 3B:
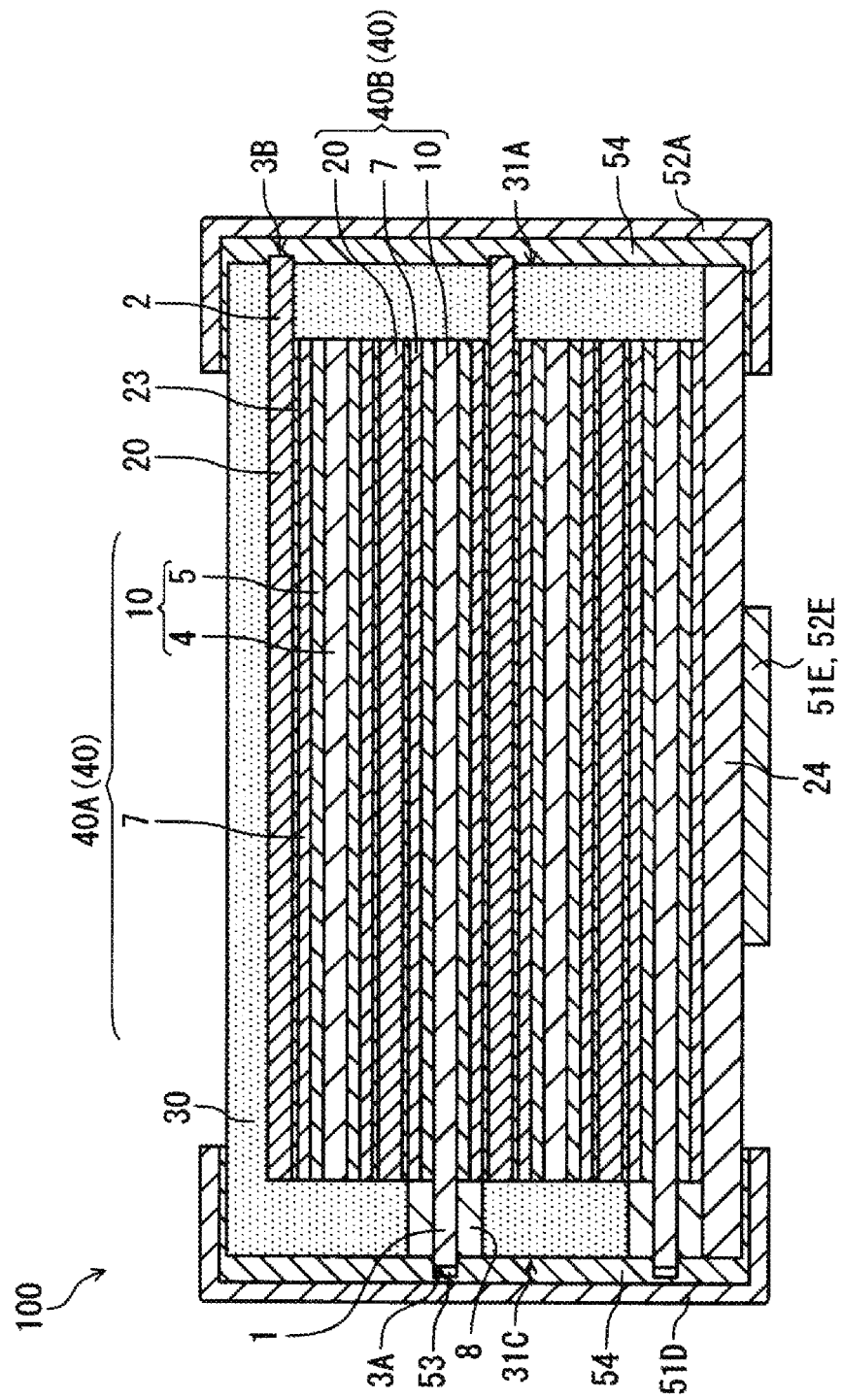
FIG. 3B is a cross-sectional view schematically illustrating the structure of the solid electrolytic capacitor according to the first exemplary embodiment of the present disclosure.
Figure 3C:
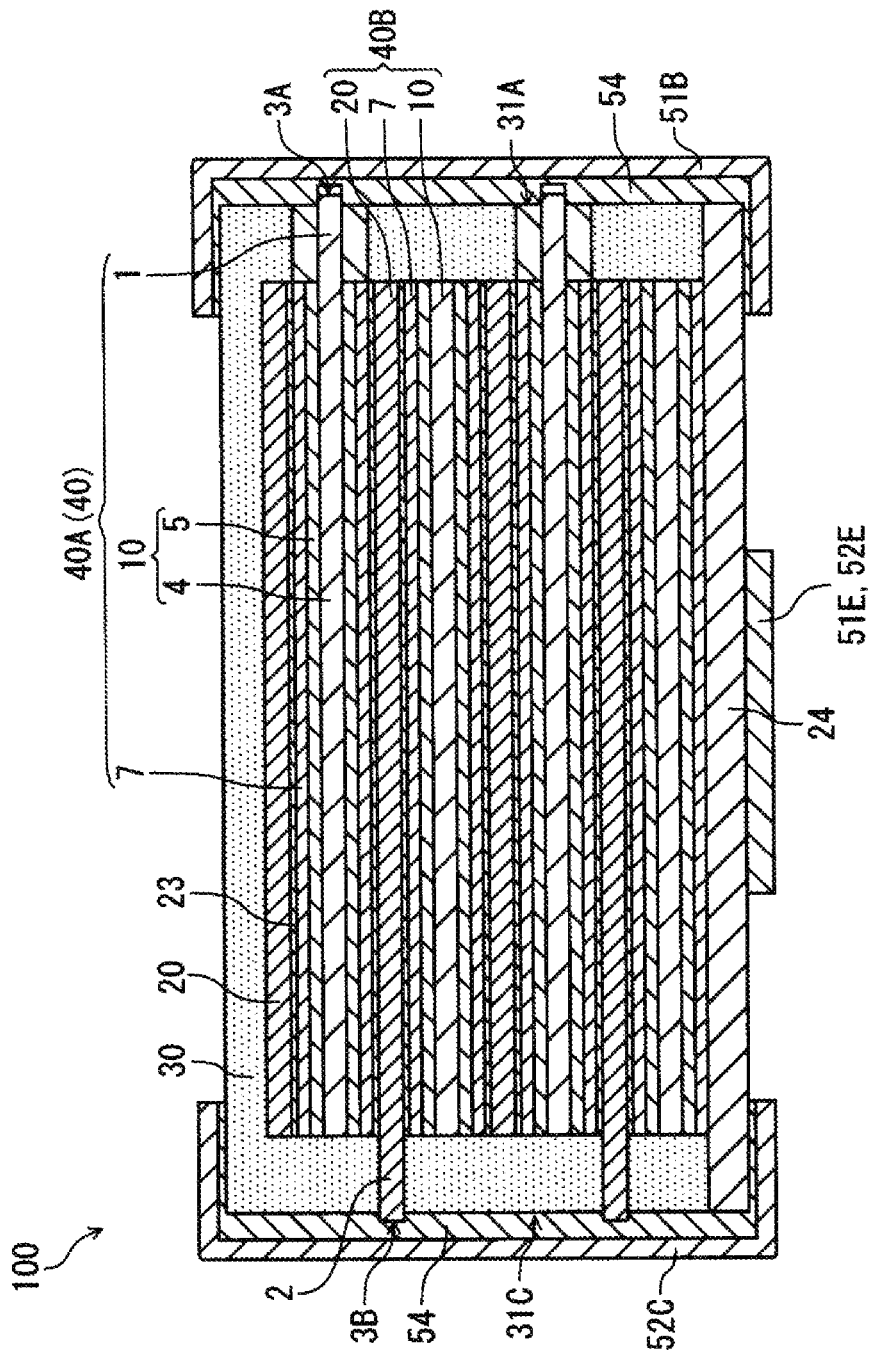
FIG. 3C is a cross-sectional view schematically illustrating the structure of the solid electrolytic capacitor according to the first exemplary embodiment of the present disclosure.

FIG. 1 is a perspective view schematically illustrating electrolytic capacitor 100 according to an exemplary embodiment of the present disclosure. FIG. 2 is a bottom view illustrating electrolytic capacitor 100. FIGS. 3A to 3C are structural cross-sectional views of electrolytic capacitor 100 which are cut in an $X_1$-$X_2$ plane, a $Y_1$-$Y_2$ plane, and a $Y_3$-$Y_4$ plane in FIG. 2, respectively. However, the electrolytic capacitor according to the present invention is not limited thereto. It is noted that electrolytic capacitor 100 described below may be manufactured by using an anode foil and a cathode foil illustrated in Configuration Example 3 of FIG. 6 to be described later.

Electrolytic capacitor 100 includes anode foil 10 as an anode body, solid electrolyte layer 7, and cathode foil 20. Anode foil 10 and cathode foil 20 are alternately stacked with solid electrolyte layer 7 interposed therebetween. Anode foil 10 and solid electrolyte layers 7 facing each other with anode foil 10 interposed therebetween constitute one capacitor element 40 (first capacitor element or second capacitor element).

Electrolytic capacitor 100 includes an element stacked body in which a plurality of capacitor elements 40 are stacked. Cathode foil 20 is interposed between adjacent capacitor elements in a stacking direction. The element stacked body is supported by substrate 24. The substrate may be, for example, an insulating substrate, or may be a metal substrate or a printed substrate provided with a wiring pattern as long as first external electrodes 51A to 51E and second external electrodes 52A to 52E can be electrically separated from each other.

Anode foil 10 has porous part 5 on a surface thereof, and a dielectric layer (not illustrated) is formed on at least a part of the surface of porous part 5. Solid electrolyte layer 7 covers at least a part of the dielectric layer.

Anode foil 10 has a region covered with solid electrolyte layer 7 and a region not covered with solid electrolyte layer 7. Anode foil 10 has end part 1. At least a part of end part 1 that is located at side close to an end surface of anode foil 10 is not covered with the solid electrolyte layer, but is covered with insulating film 8 instead. The region of end part 1 of anode foil 10 which is not covered with the solid electrolyte layer is also referred to as an anode lead-out part. Meanwhile, the region of anode foil 10 which is covered with solid electrolyte layer 7 is also referred to as a cathode formation part.

More specifically, anode foil 10 has core 4 and porous part (porous body) 5 formed on a surface of core 4 by roughening (etching or the like) or the like in the cathode formation part. On the other hand, the anode lead-out part may have porous part 5 on the surface but may not have the porous part. The dielectric layer is formed along a surface of porous part 5. At least a part of the dielectric layer covers an inner wall surface of a hole of porous part 5 and is formed along the inner wall surface. A surface of the dielectric layer has an irregularity shape corresponding to a shape of the surface of porous part 5, and solid electrolyte layer 7 may be formed to fill such irregularities of the dielectric layer.

Adhesive layer 23 is interposed between cathode foil 20 and solid electrolyte layer 7. Cathode foil 20 covers at least a part of solid electrolyte layer 7 with adhesive layer 23 interposed therebetween. Cathode foil 20, solid electrolyte layer 7, and adhesive layer 23 constitute a cathode part. Adhesive layer 23 is, for example, a carbon paste or a silver paste.

A conductive layer may be formed between solid electrolyte layer 7 and adhesive layer 23 in order to increase electrical connectivity between solid electrolyte layer 7 and adhesive layer 23 for enhancing current collecting property. The conductive layer is, for example, a carbon layer, and includes conductive carbon particles. The conductive layer may be formed so as to cover solid electrolyte layer 7. In this case, adhesive layer 23 and the conductive layer constitute a cathode layer, and have an action of enhancing the current collecting property of the capacitor element. Cathode foil 20 acts as a lead for leading out the cathode layer and connecting the cathode layer to an external electrode. The conductive layer may have a stacked structure of a carbon layer covering solid electrolyte layer 7 and a silver-paste layer covering the carbon layer. Adhesive layer 23 may be formed so as to cover the conductive layer.

Cathode foil 20 has a region facing solid electrolyte layer 7 and a region not facing solid electrolyte layer 7. Cathode foil 20 has end part 2. End part 2 of cathode foil 20 is not covered with solid electrolyte layer 7. Thus, a surface of cathode foil 20 is exposed at end part 2.

Electrolytic capacitor 100 includes the above-described element stacked body on which the plurality of capacitor elements 40 are stacked, exterior body 30 sealing the element stacked body, first external electrodes 51A to 51E, and second external electrodes 52A to 52E. First external electrodes 51A to 51E are anodes of electrolytic capacitor 100, and second external electrodes 52A to 52E are cathodes of electrolytic capacitor 100. That is, electrolytic capacitor 100 includes ten terminals constituted by first external electrodes 51A to 51E and second external electrodes 52A to 52E, which are disposed to be separated from each other.

Exterior body 30 has a substantially rectangular parallelepiped outer shape, and electrolytic capacitor 100 also has a substantially rectangular parallelepiped outer shape. Exterior body 30 has four principal surfaces 31A to 31D perpendicular to principal surfaces of anode foil 10. Second principal surface 31B and fourth principal surface 31D are surfaces intersecting first principal surface 31A. Third principal surface 31C is positioned at a side opposite to first principal surface 31A. Fourth principal surface 31D is positioned at a side opposite to second principal surface 31B. First external electrodes 51A, 51B and second external electrodes 52A, 52B are disposed along first principal surface 31A. First external electrodes 51C, 51D and second external electrodes 52C, 52D are disposed along third principal surface 31C. First external electrode 51E is disposed along fourth principal surface 31D, and second external electrode 52E is disposed along second principal surface 31B.

End surfaces 3A of end parts 1 of anode foil 10 are exposed from exterior body 30 on first principal surface 31A, third principal surface 31C, and fourth principal surface 31D to be electrically connected to first external electrodes 51A to 51E. On the other hand, end surfaces 3B of end parts 2 of cathode foil 20 are exposed from exterior body 30 on first principal surface 31A, second principal surface 31B, and third principal surface 31C to be electrically connected to second external electrodes 52A to 52E.

An another first external electrode may be disposed along second principal surface 31B to be electrically connected to end surface 3A of end part 1 of anode foil 10. An another second external electrode may be disposed along fourth principal surface 31D to be electrically connected to end surface 3B of end part 2 of cathode foil 20.

That is, in electrolytic capacitor 100, each of anode foils 10 is electrically connected to at least one of first external electrodes 51A to 51E extending along any one of the first to fourth principal surfaces on end surface 3A. Each of cathode foils 20 is electrically connected to at least one of second external electrodes 52A to 52E extending along any one of the first to fourth principal surfaces on end surface 3B. In this case, it is not necessary to bundle a plurality of end parts 1 of the capacitor elements to form the anode of the electrolytic capacitor, and it is not necessary to secure a length for bundling the plurality of ends. Thus, a proportion of end parts 1 to the anode body can be reduced to increase a capacitance of the electrolytic capacitor. The contribution of end parts 1 to an ESL is reduced.

First external electrodes 51A, 51B and second external electrodes 52A, 52B are disposed along first principal surface 31A such that the first external electrode and the second external electrode are alternately arranged (see FIG. 2). First external electrodes 51C, 51D and second external electrodes 52C, 52D are disposed along third principal surface 31C such that the first external electrode and the second external electrode are alternately arranged (see FIG. 2). As a result, a separation distance between the first external electrode as the anode and the second external electrode as the cathode can be shortened, and the ESL of the electrolytic capacitor is reduced.

In electrolytic capacitor 100, end surface 3A of end part 1 of anode foil 10 and end surface 3B of end part 2 of cathode foil 20, which are exposed from exterior body 30, are each covered with contact layer 53. Intermediate electrode layer 54 covers contact layer 53 and a part of corresponding principal surfaces 31A to 31D of exterior body 30. First external electrodes 51A to 51E and second external electrodes 52A to 52E cover corresponding intermediate electrode layers 54, respectively.

Each of first external electrodes 51A to 51E and second external electrodes 52A to 52E is bent inward along a bottom surface of exterior body 30 and is exposed on the bottom surface of electrolytic capacitor 100. Exposed portions of first external electrodes 51A to 51E on the bottom surface constitute anode terminals of the electrolytic capacitor. On the other hand, the exposed portions of second external electrodes 52A to 52E on the bottom surface constitute cathode terminals of the electrolytic capacitor. That is, in the present exemplary embodiment, electrolytic capacitor 100 has five anode terminals separated from each other and five cathode terminals separated from each other. In the present exemplary embodiment, two anode terminals and two cathode terminals are disposed along the same side of the bottom surface of electrolytic capacitor 100, and the anode terminal and the cathode terminal are alternately arranged along the side. In this case, the separation distance between the anode terminal and the cathode terminal can be shortened, and the ESL is reduced as compared with the conventional configuration in which an anode terminal and a cathode terminal are disposed along the sides opposite to each other on the bottom surface of electrolytic capacitor 100.

Capacitor element 40 may include first capacitor element 40A and second capacitor element 40B. In first capacitor element 40A, end surface 3A of end part 1 of anode foil 10 is exposed from exterior body 30 on first principal surface 31A, and is not exposed from exterior body 30 on third principal surface 31C (see FIG. 3C). On the other hand, in second capacitor element 40B, end surface 3A of end part 1 of anode foil 10 is exposed from exterior body 30 on third principal surface 31C, and is not exposed from exterior body 30 on first principal surface 31A (see FIG. 3B).

In first capacitor element 40A and second capacitor element 40B, a direction of a current flowing through the anode foil is opposite to a normal direction of first principal surface 31A or third principal surface 31C. Thus, a magnetic field generated by a current flowing through first capacitor element 40A and a magnetic field generated by a current flowing through second capacitor element 40B cancel each other, and a magnetic flux generated in electrolytic capacitor 100 decreases. As a result, the ESL of the electrolytic capacitor is reduced.

Cathode foil 20 may further include first cathode foils and second cathode foils. In FIGS. 3A to 3C, the first cathode foils are positioned in an uppermost layer and a third layer from the top in the stacking of the element stacked bodies. In the first cathode foil, end surface 3B of end part 2 of cathode foil 20 is exposed from exterior body 30 on first principal surface 31A, and is not exposed from exterior body 30 on third principal surface 31C (see FIG. 3B). On the other hand, in FIGS. 3A to 3C, the second cathode foils are positioned in a second layer and a lowermost layer from the top in the stacking of the element stacked bodies. In the second cathode foil, end surface 3B of end part 2 of cathode foil 20 is exposed from exterior body 30 on third principal surface 31C, and is not exposed from exterior body 30 on first principal surface 31A (see FIG. 3C).

In the element stacked body, the first cathode foil and the second cathode foil are alternately stacked to constitute electrolytic capacitor 100. In this case, in the first cathode foil and the second cathode foil, a direction of a current flowing through the cathode foil is opposite in a normal direction of first principal surface 31A or third principal surface 31C. Thus, a magnetic field generated by the current flowing through the first cathode foil and a magnetic field generated by the current flowing through the second cathode foil cancel each other, and the magnetic flux generated in electrolytic capacitor 100 decreases. As a result, the ESL of the electrolytic capacitor is reduced.

(Method for Manufacturing Electrolytic Capacitor)

Electrolytic capacitor 100 may be manufactured by, for example, a manufacturing method including a first step of preparing a capacitor element having an anode body, a second step of preparing a cathode foil, a third step of alternately stacking the capacitor element and the cathode foil to obtain an element stacked body, a fourth step of covering the element stacked body with an exterior body, a fifth step of forming end surfaces of the anode body and the cathode foil and exposing the end surfaces from the exterior body, and a sixth step of electrically connecting the exposed end surface of the anode body with a first external electrode and electrically connecting the end surface of the cathode foil with a second external electrode.

(First Step)

The first step includes, for example, the following steps (i) to (iii):

(i) a step of preparing an anode foil having a porous part formed on a surface of the anode foil;

(ii) a step of forming a dielectric layer on the surface of the anode foil; and (iii) a step of covering at least a part of the anode foil with a solid electrolyte layer.

Figure 4:
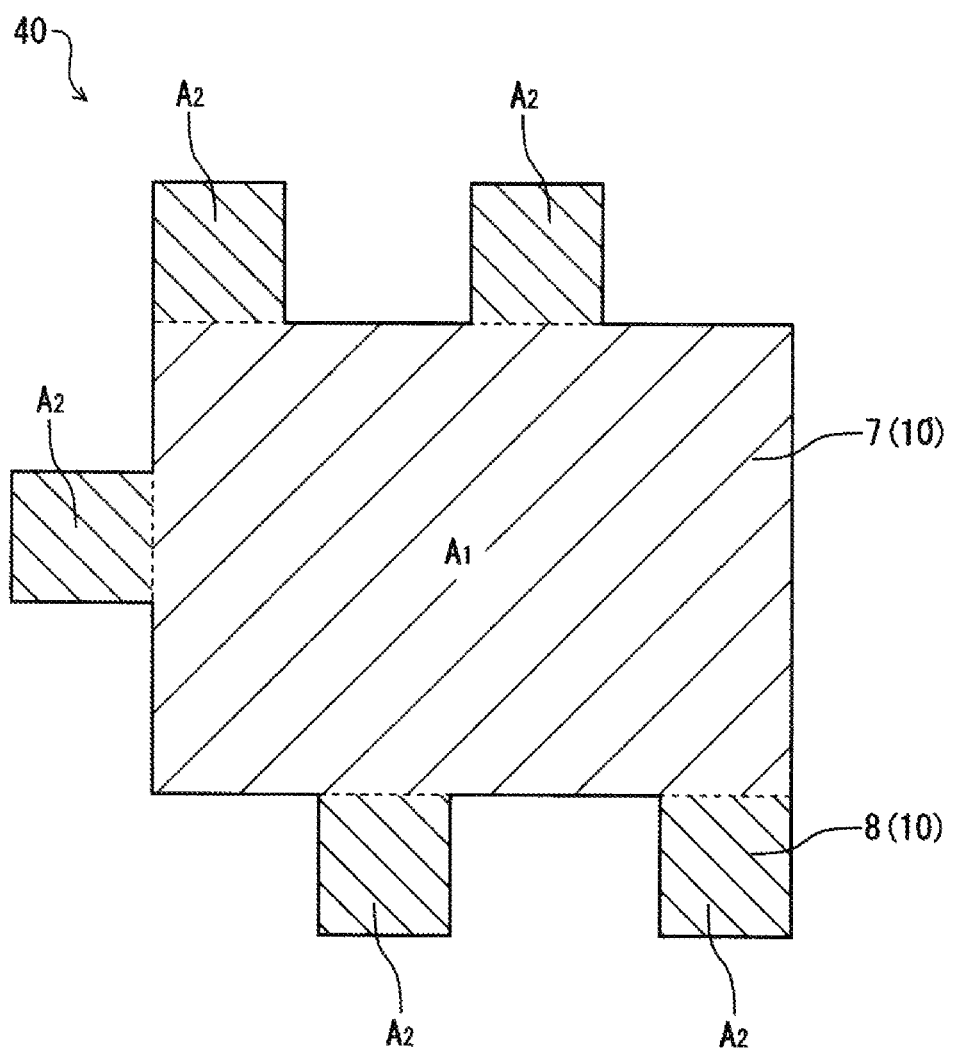
FIG. 4 is a diagram illustrating an example of a layout of a capacitor element used in the electrolytic capacitor according to the first exemplary embodiment of the present disclosure.

The anode foil is processed into a shape having a first region and a second region protruding from the first region. The processing is performed, for example, by cutting a large anode foil into a predetermined shape. The processing may be performed before or after each of steps (i) to (iii), and may be performed at any point in time in the first step. FIG. 4 illustrates an example of a layout of the capacitor element prepared in the first step as viewed in a direction perpendicular to a principal surface of the anode body.

As illustrated in FIG. 4, in capacitor element 40, anode foil 10 has first region $A_1$ and second region $A_2$ protruding from first region $A_1$. The entire surface of first region $A_1$ is covered with solid electrolyte layer 7. On the other hand, solid electrolyte layer 7 is not formed in at least a part of second region $A_2$. Solid electrolyte layer 7 may not be formed at least at an end part of second region $A_2$ in the protruding direction. In second region $A_2$, an end surface of anode foil 10 is exposed from an exterior body to be electrically connected to a first external electrode.

Step (i)

First, an anode foil having a porous part formed on a surface is prepared. The anode foil may include a valve metal, an alloy containing a valve metal, a compound including a valve metal (such as an intermetallic compound), and the like. These materials may be used singly or in combination of two or more kinds thereof. As the valve metal, aluminum, tantalum, niobium, titanium, or the like may be used. The anode foil may be a foil of a valve metal, an alloy containing a valve metal, or a compound containing a valve metal, or may be a porous sintered body (sintered foil) of a valve metal, an alloy containing a valve metal, or a compound containing a valve metal.

When a metal foil is used for the anode foil, a porous part is usually formed to increase the surface area. The porous part may be formed on the entire surface of the anode foil, or may be formed in a predetermined region (for example, first region $A_1$) of a part of the surface of the anode foil. The porous part may be formed by roughening the entire surface of the anode foil by etching or the like. A roughening treatment such as an etching treatment may be performed after disposing a masking member in a predetermined region of the surface of the anode foil. The etching treatment is performed by using a known technique, such as electrolytic etching. The masking member is not particularly limited, but an insulator such as resin is preferable. The masking member may be a conductive material, which needs to be removed before the formation of the solid electrolyte layer.

The porous part may not be formed in a region of the anode foil where second region $A_2$ is to be formed. When the porous part is formed in second region $A_2$, adhesion between the porous part and the exterior body is not sufficient, and air (specifically, oxygen and moisture) enters the inside of the electrolytic capacitor through a contact portion between the porous part and the exterior body in some cases. Forming no porous part in second region $A_2$ causes adhesion between the anode foil and the exterior body to be maintained high, inhibits air from entering the electrolytic capacitor through the porous part from second region $A_2$ exposed from the exterior body, and inhibits the reliability of the electrolytic capacitor from lowering due to the entering of air.

Step (ii)

Next, a dielectric layer is formed on the surface of the anode foil. The dielectric layer is formed, for example, by anodizing a predetermined region including the region where the porous part is formed on the surface of the anode foil by an anodizing treatment or the like. The dielectric layer contains an oxide of valve metal. For example, when aluminum is used as the valve metal, the dielectric layer contains aluminum oxide. The dielectric layer is formed at least along the surface of the porous part (including the inner wall surface of the pore of the porous part). The method for forming the dielectric layer is not limited to this, and an insulating layer functioning as a dielectric material may be formed on the surface of the porous part.

Step (iii)

Next, solid electrolyte layer 7 is formed in the first region of the anode foil. At this time, insulating film 8 may be formed in second region $A_2$. In the present exemplary embodiment, solid electrolyte layer 7 and insulating film 8 are formed on both surfaces of the anode foil. Insulating film 8 is a film (resist) for preventing the solid electrolyte layer from being formed in a predetermined region (for example, second region $A_2$) of the anode foil. Insulating film (resist) 8 may be formed by supplying a resin to a predetermined region of the anode foil, for example, by screen printing, inkjet, transfer, tape bonding, or the like. Examples of the resin material include insulating resins such as epoxy resin, phenol resin, silicone resin, melamine resin, urea resin, alkyd resin, polyurethane, polyamide, polyimide, polyamide-imide, and unsaturated polyester.

The resin material may contain the same resin as the resin used in the exterior body described later. However, it is preferable that the resin used for the insulating film does not contain a filler or contains a filler having a particle size smaller than that of the filler contained in the resin used for the exterior body from the viewpoint of easily impregnating the deep portion of the recess on the surface of the porous part of the anode foil with the liquid resin material and easily forming the insulating film with a small thickness so that a plurality of capacitor elements can be stacked.

Solid electrolyte layer 7 contains, for example, a conductive polymer. As the conductive polymer, for example, polypyrrole, polythiophene, polyaniline, derivatives thereof, and the like may be used. The solid electrolyte layer may be formed, for example, by applying a solution in which the conductive polymer is dissolved or a dispersion liquid in which the conductive polymer is dispersed to the dielectric layer. The solid electrolyte layer may be formed, for example, through chemical polymerization and/or electrolytic polymerization of raw material monomer on the dielectric layer. Solid electrolyte layer 7 may contain a manganese compound.

For example, after insulating film (resist) 8 is formed in second region $A_2$, solid electrolyte layer 7 is formed in a region (first region $A_1$) where insulating film (resist) 8 is not formed. As a result, capacitor element 40 illustrated in FIG. 4 is obtained. In the example of FIG. 4, anode foil 10 has five second regions $A_2$ protruding from first region $A_1$.

When the anode foil is cut into a predetermined shape after step (ii) and before step (iii), a core of the anode foil not covered with the dielectric layer is exposed on the end surface of the anode foil by the cutting. When the solid electrolyte layer is formed, an insulating layer may be formed on the exposed end surface of the anode foil such that the exposed core is not covered with the solid electrolyte layer. The insulating layer may be formed, for example, by performing an anodizing treatment on the end surface to form an oxide film on the surface of the exposed core.

(Second Step)

Cathode foil 20 is prepared in parallel with the first step. The cathode foil is a conductive sheet, and is, for example, a metal foil such as an aluminum foil. The metal foil may be a sintered foil, a vapor deposited foil, or a coated foil whose surface is coated with a conductive film. Examples of the conductive film include titanium (Ti), titanium carbide (TiC), titanium oxide (TiO), and C (carbon) films. The conductive film may be a carbon coating film.

Figure 5:
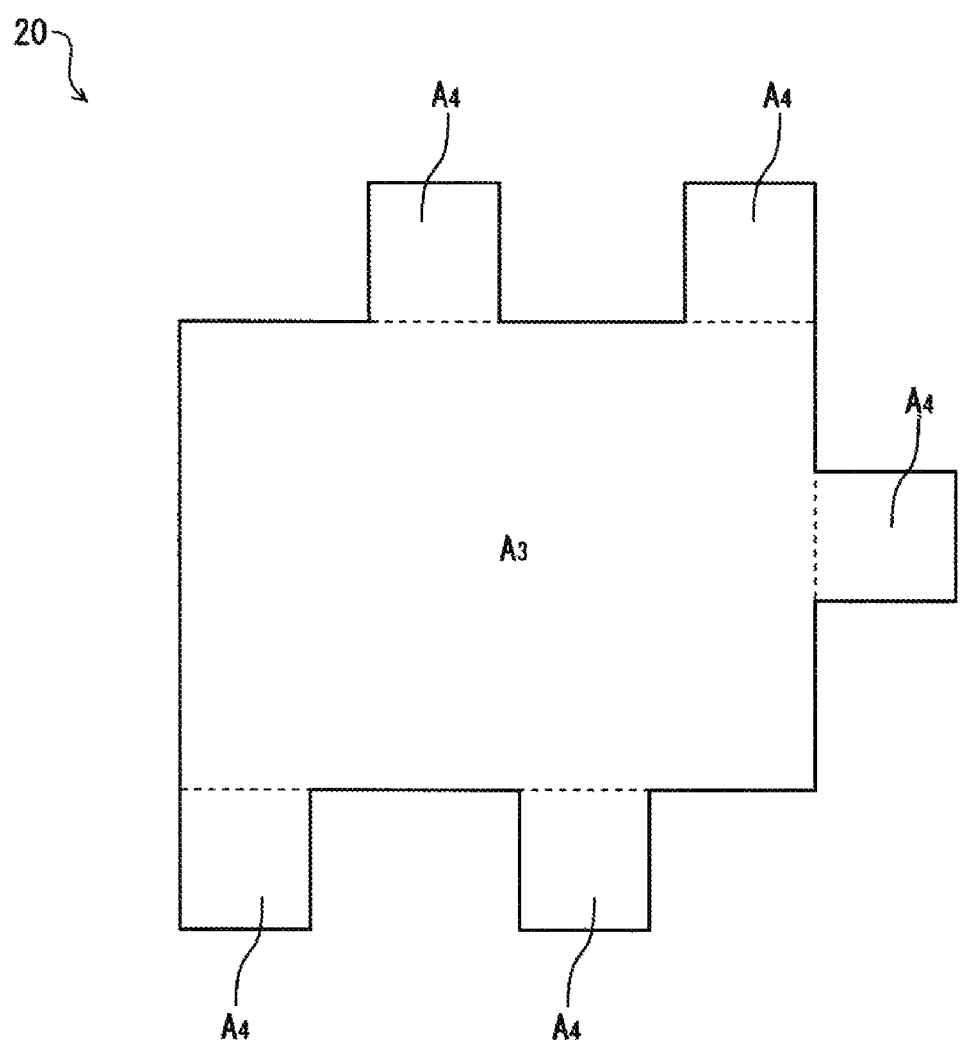
FIG. 5 is a diagram illustrating an example of a shape of a cathode foil used in the electrolytic capacitor according to the first exemplary embodiment of the present disclosure.

The cathode foil is processed into a shape having a third region and a fourth region protruding from the third region. The processing is performed, for example, by cutting a large anode foil into a predetermined shape. FIG. 5 illustrates an example of a shape of the cathode foil prepared in the second step as viewed in a direction perpendicular to a principal surface.

As illustrated in FIG. 5, cathode foil 20 has third region $A_3$ and fourth region $A_4$ protruding from third region $A_3$. In the example of FIG. 5, cathode foil 20 has five fourth regions $A_4$ protruding from third region $A_3$. In fourth region $A_4$, an end surface of cathode foil 20 is exposed from the exterior body to be electrically connected to a second external electrode.

(Third Step)

Subsequently, the capacitor element prepared in the first step and the cathode foil prepared in the second step are alternately stacked. At this time, capacitor element 40 and cathode foil 20 are alternately placed such that first region $A_1$ of anode foil 10 and third region $A_3$ of cathode foil 20 overlap each other to obtain an element stacked body. However, second region $A_2$ of anode foil 10 and fourth region $A_4$ of cathode foil 20 do not overlap each other even when first region $A_1$ and third region $A_3$ overlap each other.

Conductive adhesive layer 23 such as carbon paste or silver paste may be interposed between anode foil 10 and cathode foil 20. The carbon paste is formed on anode foil 10 by, for example, coating so as to cover a region of anode foil 10 covered with the solid electrolyte layer or a cathode layer. Similarly, the silver paste is formed on anode foil 10 by, for example, coating so as to cover a region covered with the solid electrolyte layer or the cathode layer.

(Fourth Step)

Subsequently, the element stacked body is placed on the substrate. The substrate may be a multilayer substrate in which wiring patterns are formed on the front surface and the back surface. A third external electrode may be formed on the multilayer substrate at a surface opposite to a surface on which the element stacked body is placed. When placed, the third external electrode is electrically connected to the cathode part (solid electrolyte layer) of the capacitor element constituting the element stacked body via the wiring patterns formed on the multilayer substrate and a via hole connecting the wiring pattern on the front surface and the wiring pattern on the back surface. The element stacked body may be bonded onto the substrate by using a conductive adhesive.

Thereafter, the element stacked body is covered with the exterior body. Exterior body 30 preferably contains, for example, a cured product of a curable resin composition, and may contain a thermoplastic resin or a composition containing a thermoplastic resin.

Exterior body 30 may be formed by using a molding technique such as injection molding. The exterior body may be formed, for example, by using a predetermined mold and filling a predetermined portion with a curable resin composition or a thermoplastic resin (composition) to cover the element stacked body.

The curable resin composition may contain a filler, a curing agent, a polymerization initiator, a catalyst, and/or the like, in addition to the curable resin. Examples of the curable resin include epoxy resin, phenol resin, urea resin, polyimide, polyamide-imide, polyurethane, diallyl phthalate, and unsaturated polyester. Examples of the thermoplastic resin include polyphenylene sulfide (PPS) and polybutylene terephthalate (PBT). A thermoplastic resin composition containing a thermoplastic resin and a filler may be used.

As the filler, for example, insulating particles and/or fibers are preferable. Examples of an insulating material that constitutes the filler include insulating compounds (oxides, and the like) such as silica and alumina, glass, and mineral materials (talc, mica, clay, and the like). The exterior body may contain one type of these fillers, or may contain two or more types of these fillers in combination.

The resin used in exterior body 30 may contain the same resin as the resin used in insulating film 8 (resist) described above. In this case, the adhesion between the insulating film and the exterior body improves, and air is further inhibited from entering the electrolytic capacitor. Examples of the same resin contained in the insulating film and the exterior body include an epoxy resin. On the other hand, the filler that may be contained in the exterior body may be different from the filler that may be contained in the insulating film.

(Fifth Step)

Subsequently, the end surfaces of the anode body and the cathode foil are formed and exposed from the exterior body. More specifically, by partially removing the exterior body at four principal surfaces of the exterior body perpendicular to the principal surfaces of anode foil 10 and cathode foil 20, the end of second region $A_2$ of anode foil 10 (specifically, the end surface of the end of second region $A_2$) and the end of fourth region $A_4$ of cathode foil 20 (specifically, the end surface of the end of fourth region $A_4$) are exposed from the exterior body. For example, after the capacitor element is covered with the exterior body, the surface of the exterior body may be polished or a part of the exterior body may be separated such that the end of second region $A_2$ and the end of fourth region $A_4$ are exposed from the exterior body. A part of second region $A_2$ and a part of fourth region $A_4$ may be separated together with a part of the exterior body. In this case, an end part having a surface which does not include the porous part and a natural oxide film can be more easily exposed than the exterior body, and thus a highly reliable connection state where resistance is small between the end part and the external electrode is obtained. Preferably, the exterior body is cut by dicing. As a result, an exposed end surface of anode foil 10 in second region $A_2$ and an end surface of cathode foil 20 in fourth region $A_4$ appear on the cutting surface of the exterior body.

(Sixth Step)

Subsequently, the exposed end surface of the anode body is electrically connected to the first external electrode, and the exposed end surface of the cathode foil is electrically connected to the second external electrode.

In this step, for example, first external electrodes 51A to 51E are formed so as to cover the exposed end surface of second region $A_2$ and predetermined regions of first to fourth principal surfaces 31A to 31D of the exterior body so that each of first external electrodes 51A to 51E is electrically connected to anode foil 10. Second external electrodes 52A to 52E are formed so as to cover the exposed end surface of fourth region $A_4$ and predetermined regions of first to fourth principal surfaces 31A to 31D of the exterior body so that each of second external electrodes 52A to 52E is electrically connected to cathode foil 20. The electrical connection between each end surface and the first or second external electrode may be performed, for example, by joining, electrolytic plating, electroless plating, a physical vapor deposition method, a chemical vapor deposition method, a cold spraying method, and/or a thermal spraying method. Among these methods, the electroless plating is preferable.

The first external electrode and the second external electrode are preferably metal layers. The metal layer may contain, for example, at least one selected from the group consisting of nickel (Ni), copper (Cu), zinc (Zn), tin (Sn), silver (Ag), and gold (Au).

The first external electrode and the second external electrode may have, for example, a stacked structure of a Ni layer and a Sn layer. At least the outer surface of each of the first to fourth external electrodes is a metal having excellent wettability with solder. Examples of such a metal include Sn, Au, Ag, and Pd.

Prior to the formation of the first external electrode and the second external electrode, a step of forming contact layer 53 on the surfaces which are the exposed end surfaces of second region $A_2$ and fourth region $A_4$, and/or a step of forming intermediate electrode layer 54 covering a predetermined region of the corresponding principal surface of the exterior body may be performed. When intermediate electrode layer 54 is formed, the first external electrode and the second external electrode may be formed to cover intermediate electrode layer 54.

When the intermediate electrode layer is formed, the first to fourth external electrodes may be formed by bonding a Cu cap on which a Sn film is formed in advance to the intermediate electrode layer.

(Step of Forming Contact Layer)

Contact layer 53 may be formed by, for example, a cold spraying method, thermal spraying, plating, vapor deposition, or the like. The contact layer may be formed to selectively cover the end surface of the anode foil or the cathode foil exposed from the exterior body while the principal surface of the exterior body is not covered by the contact layer as much as possible.

In particular, the cold spraying method is a technique in which metal particles having a size of several m to several tens of m are accelerated at a speed from a subsonic speed to a supersonic speed by compressed gas such as air, nitrogen, and helium to collide with a base material in a solid phase state to form a metal film. Although there is unknown part in the adhesion mechanism of the metal particles in the cold spraying method, it is generally considered that the metal particles or the metal substrate are plastically deformed by the collision energy of the metal particles, and a newly formed surface is exposed on the metal surface to be activated.

When the cold spraying method is used, the contact layer is formed by causing metal particles to collide with each end surface at high speed. By using the cold spraying method, it is possible to realize a state where the metal particles are hardly fixed to the resin base material, and to selectively form the contact layer on the end surfaces of the anode foil and/or the cathode foil. In this case, the resin base material is brittlely fractured by the collision energy of the metal particles, and the surface of the resin base material is scraped off. Thus, the contact layer may be selectively formed on the end surface of the anode foil and/or the cathode foil, and the principal surface of the exterior body may be roughened. Since the principal surface of the exterior body is roughened, the contact area between the exterior body and the external electrodes (or the intermediate electrode) increases, and thus the adhesion between the exterior body and the external electrodes (or the intermediate electrode) is improved by the anchor effect. As a result, it is possible to further enhance the reliability.

The metal particles may be particles of a metal having a lower ionization tendency than the metal constituting the anode body. For example, when the anode body is an $A_1$ foil, examples of such metal particles include Cu particles. In this case, the Cu particles that collide with the end surface of the first end at high speed break through the natural oxide film ($A_1$ oxide film) formed on the end surface, and a metal bond between $A_1$ and Cu may be formed. As a result, an alloy layer of $A_1$ and Cu may be formed at the interface between the contact layer and the first end. On the other hand, the surface of the contact layer is covered with a Cu layer which is a non-valve metal. Since Cu has a smaller ionization tendency than $A_1$, the surface of the contact layer is hardly oxidized, and electrical connection with the external electrodes (or the anode electrode layer) can be reliably performed.

(Step of Forming Intermediate Electrode Layer)

Intermediate electrode layer 54 may be formed to cover any one of the end surface of the end of second region $A_2$ of the anode foil and/or the end surface of fourth region $A_4$ of the cathode foil or the contact layer and cover the corresponding principal surface of the exterior body.

The intermediate electrode layer may be formed by applying a conductive paste containing conductive particles and a resin material. Specifically, a conductive paste (for example, silver paste) is applied to each end surface by a dipping method, a transfer method, a printing method, a dispensing method, or the like, and then cured at a high temperature to form the intermediate electrode layer.

Alternatively, the intermediate electrode layer as a metal layer may be formed by electrolytic plating, electroless plating, a sputtering method, a vacuum vapor deposition method, a chemical vapor deposition (CVD) method, a cold spraying method, or a thermal spraying method.

The intermediate electrode layer may cover a part of a surface (for example, a top or bottom surface) orthogonal to the first to fourth principal surfaces of the exterior body.

Figure 6:
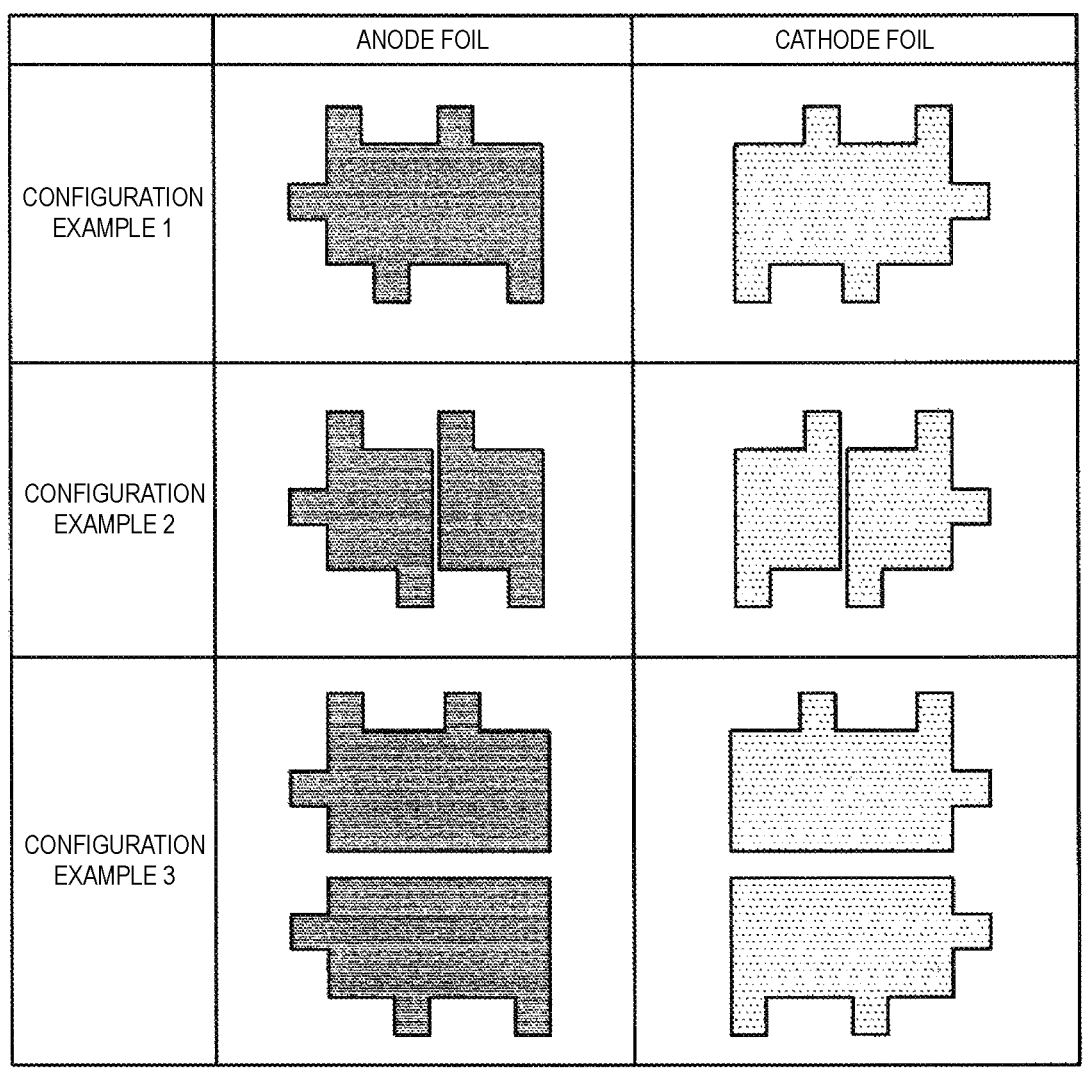
FIG. 6 is a table representing an example of a combination of an anode foil and a cathode foil used in the electrolytic capacitor according to the first exemplary embodiment of the present disclosure.
Figure 7:
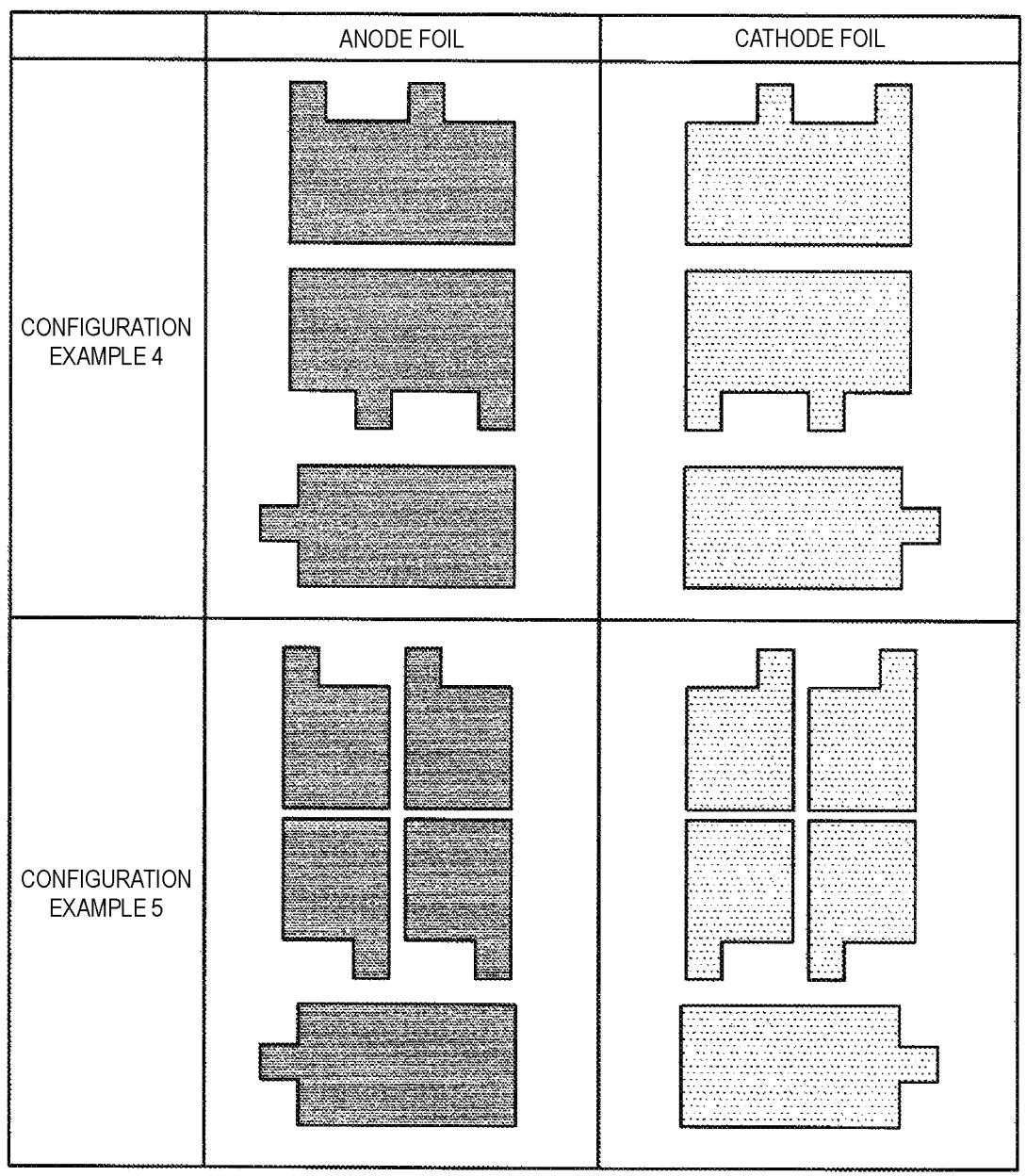
FIG. 7 is a table representing an example of the combination of the anode foil and the cathode foil used in the electrolytic capacitor according to the first exemplary embodiment of the present disclosure.
Figure 8:
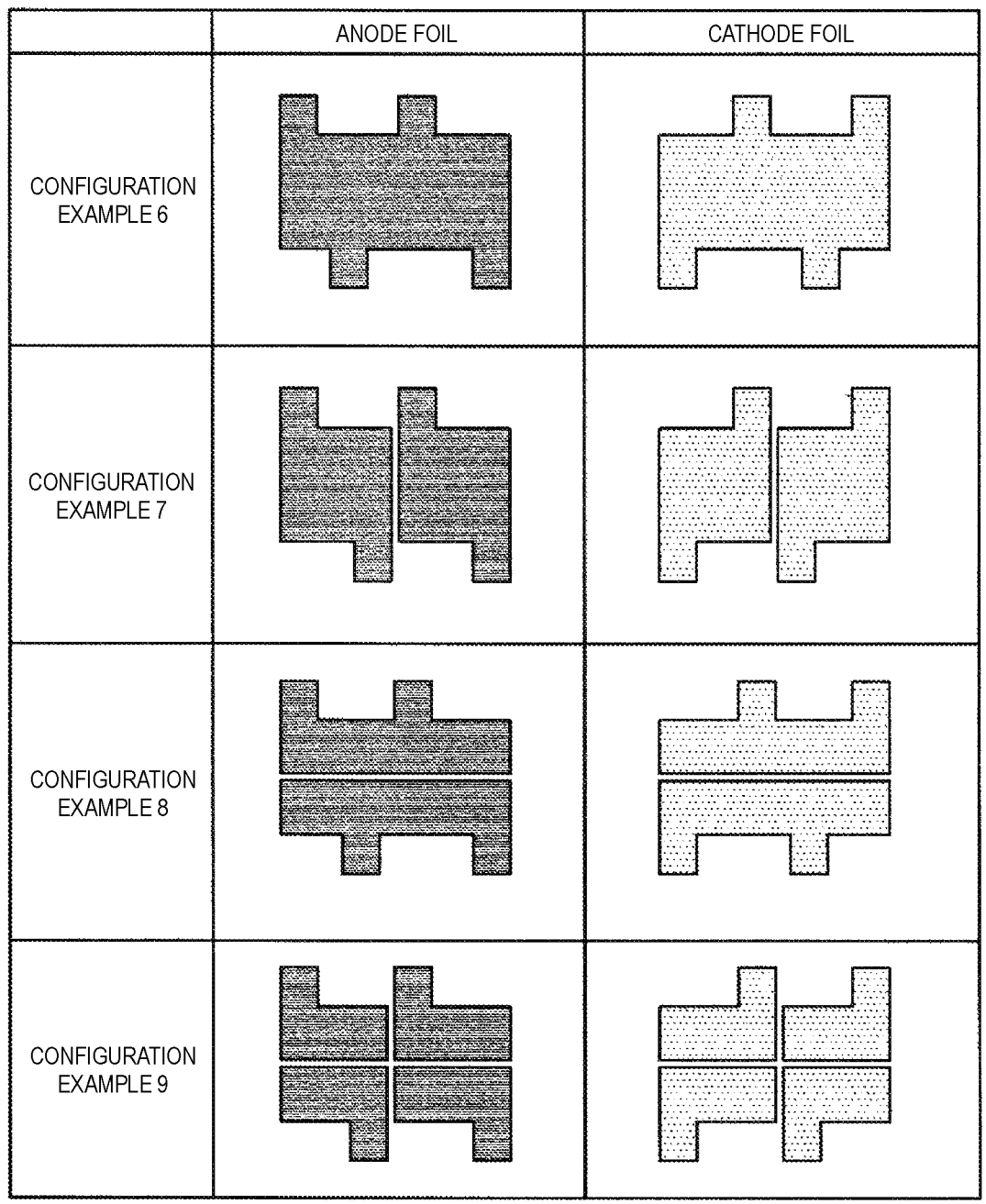
FIG. 8 is a table representing an example of the combination of the anode foil and the cathode foil used in the electrolytic capacitor according to the first exemplary embodiment of the present disclosure.

FIGS. 6 to 9 illustrate other examples of combinations of a shape of anode foil 10 used in the first step and a shape of cathode foil 20 used in the second step. FIGS. 6 and 7 are examples of a case where the electrolytic capacitor having ten terminals (five anode terminals and five cathode terminals) is constituted, and FIGS. 8 and 9 are examples of a case where the electrolytic capacitor having eight terminals (four anode terminals and four cathode terminals) is constituted.

Configuration Example 1 illustrated in FIG. 6 corresponds to a combination of the anode foil of the capacitor element illustrated in FIG. 4 and the cathode foil illustrated in FIG. 5.

As illustrated in Configuration Example 2 of FIG. 6, the anode foil and/or the cathode foil may include a plurality of foil pieces, and the plurality of foil pieces may be arranged. In this case, the direction of the current flowing through the anode foil and/or the cathode foil is limited, and the ESL is easily controlled. The sizes of the anode foil and the cathode foil are reduced, and thus, handling in manufacturing becomes easy.

As illustrated in Configuration Example 3 of FIG. 6 and Configuration Examples 4 and 5 of FIG. 7, an element stacked body may be formed by using a plurality of anode foils having different protrusion positions of second region $A_2$ in combination and/or a plurality of cathode foils having different protrusion positions of fourth region $A_4$ in combination.

In Configuration Example 3 of FIG. 6, a pair of anode foils having different protrusion positions of second region $A_2$ may be used. A pair of cathode foils having different protrusion positions of fourth region $A_4$ may be used. One of the pair of anode foils has second region $A_2$ protruding in a first direction (for example, the normal direction of the first principal surface of the exterior body), but does not have second region $A_2$ protruding in a direction opposite to the first direction (for example, the normal direction of the third principal surface of the exterior body). The other of the pair of anode foils has second region $A_2$ protruding in a direction opposite to the first direction, and does not have second region $A_2$ protruding in the first direction. One of the pair of cathode foils has fourth region $A_4$ protruding in the first direction, but does not have fourth region $A_4$ protruding in a direction opposite to the first direction. The other of the pair of cathode foils has fourth region $A_4$ protruding in a direction opposite to the first direction, and does not have fourth region $A_4$ protruding in the first direction.

For example, electrolytic capacitor 100 having a cross-sectional structure illustrated in FIGS. 3A to 3C is obtained by alternately stacking a capacitor element (first capacitor element) using one of the pair of anode foils illustrated in Configuration Example 3 and a capacitor element (second capacitor element) using the other of the pair of anode foils and alternately stacking the pair of anode foils illustrated in Configuration Example 3.

As illustrated in Configuration Example 4 of FIG. 7, three or more kinds of anode foils may be used in combination, or three or more kinds of cathode foils may be used in combination. As illustrated in Configuration Example 5 of FIG. 7, at least one of the plurality of anode foils or the plurality of cathode foils used in combination may include a plurality of foil pieces.

In Configuration Examples 6 to 10 illustrated in FIGS. 8 and 9, second region $A_2$ of the anode foil and fourth region $A_4$ of the cathode foil protrude in the first direction (for example, the normal direction of the first principal surface of the exterior body) and/or in the direction opposite to the first direction (for example, the normal direction of the third principal surface of the exterior body). However, second region $A_2$ and fourth region $A_4$ that protrude in a direction (For example, the normal direction of the second principal surface or the fourth principal surface of the exterior body) intersecting the first direction are not provided.

In this case, as illustrated in Configuration Examples 7 to 9 of FIG. 8, the anode foil and/or the cathode foil may also include a plurality of foil pieces, and the plurality of foil pieces may be arranged. That is, the anode foil and/or the cathode foil may be divided in the second direction perpendicular to the first direction to form the foil pieces as in Configuration Example 7, or may be divided in the first direction to form the foil pieces as in Configuration Example 8. As in Configuration Example 9, the anode foil and/or the cathode foil may be divided into four foil pieces in the first direction and the second direction.

Similarly to Configuration Example 3, as illustrated in Configuration Example 10 of FIG. 9, an element stacked body may be formed by using a plurality of anode foils having different protrusion positions of second region $A_2$ in combination and/or a plurality of cathode foils having different protrusion positions of fourth region $A_4$ in combination.

In Configuration Example 10 of FIG. 9, a pair of anode foils having different protrusion positions of second region $A_2$ may be used. A pair of cathode foils having different protrusion positions of fourth region $A_4$ may be used. One of the pair of anode foils has second region $A_2$ protruding in the first direction, but does not have second region $A_2$ protruding in the direction opposite to the first direction. The other of the pair of anode foils has second region $A_2$ protruding in a direction opposite to the first direction, and does not have second region $A_2$ protruding in the first direction. One of the pair of cathode foils has fourth region $A_4$ protruding in the first direction, but does not have fourth region $A_4$ protruding in a direction opposite to the first direction. The other of the pair of cathode foils has fourth region $A_4$ protruding in a direction opposite to the first direction, and does not have fourth region $A_4$ protruding in the first direction.

Electrolytic capacitor 100 may be manufactured by alternately stacking the capacitor element (first capacitor element) using one of the pair of anode foils and the capacitor element (second capacitor element) using the other of the pair of anode foils illustrated in Configuration Example 10 to form the element stacked body.

As illustrated in Configuration Example 11 of FIG. 9, the anode foil and/or the cathode foil may include a plurality of strip-shaped foil pieces, and the plurality of strip-shaped foil pieces may be arrayed at positions shifted in the longitudinal direction of the strips with respect to the adjacent anode foil or cathode foil in the stacking direction to form the anode lead-out part and/or the cathode lead-out part. Accordingly, the element stacked body may be formed.

Second Exemplary Embodiment

At least one first external electrode and at least one second external electrode may be disposed on first principal surface 31A. In the example of FIG. 1, a distance between first principal surface 31A and third principal surface 31C is shorter than a distance between second principal surface 31B and fourth principal surface 31D. However, the distance between first principal surface 31A and third principal surface 31C may be longer than the distance between second principal surface 31B and fourth principal surface 31D. That is, when the electrolytic capacitor is viewed from above (for example, viewed in the direction perpendicular to the principal surface of the anode body), at least one first external electrode and at least one second external electrode may be disposed on a surface constituting a short side of a contour line of the substantially rectangular exterior body. In this case, the distance between the first external electrode and the second external electrode is shortened, and the ESL of the electrolytic capacitor is easily reduced.

Figure 10:
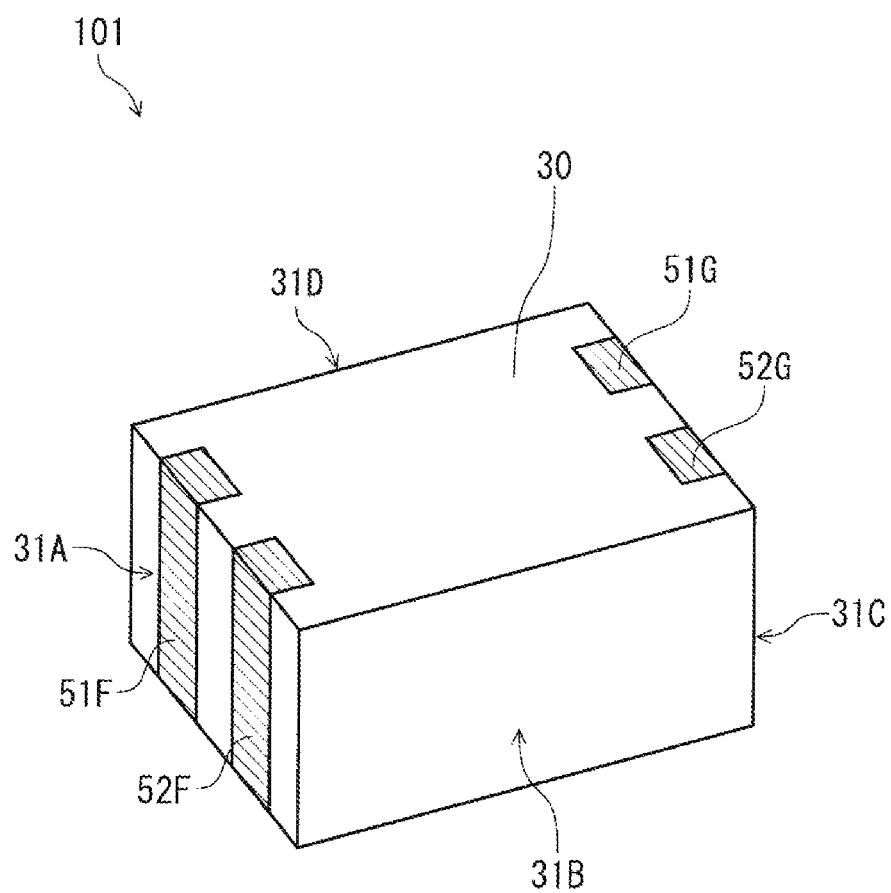
FIG. 10 is a perspective view schematically illustrating an electrolytic capacitor according to a second exemplary embodiment of the present disclosure.

FIG. 10 is a perspective view schematically illustrating electrolytic capacitor 101 according to the present exemplary embodiment. Electrolytic capacitor 101 includes the element stacked body described above, exterior body 30 that seals the element stacked body, first external electrodes 51F, 51G, and second external electrodes 52F, 52G. First external electrodes 51F, 51G are anodes of electrolytic capacitor 101, and second external electrodes 52F, 52G are cathodes of electrolytic capacitor 101.

First external electrode 51F and second external electrode 52F are disposed on first principal surface 31A. First external electrode 51G and second external electrode 52G are disposed on third principal surface 31C. As illustrated in FIG. 10, first principal surface 31A and third principal surface 31C correspond to short sides of a rectangular contour line when the electrolytic capacitor is viewed from above. As a result, electrolytic capacitor 101 having four terminals (two anode terminals and two cathode terminals) is constituted.

Figure 11:
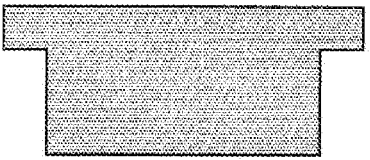
FIG. 11 is a table representing an example of a combination of an anode foil and a cathode foil used in the electrolytic capacitor according to the second exemplary embodiment of the present disclosure.
Figure 11:
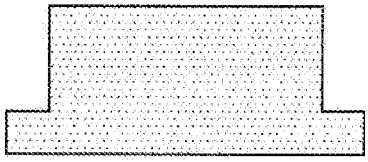
Figure 11:
Figure 11:
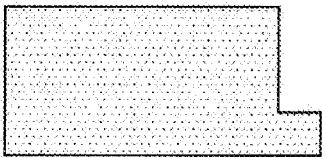

FIG. 11 is a table representing an example of a combination of the shape of anode foil 10 used in the first step for manufacturing electrolytic capacitor 101 and the shape of cathode foil 20 used in the second step.

Configuration Example 12 illustrated in FIG. 11 is an example of a case where one anode foil and one cathode foil are used.

As illustrated in Configuration Example 13 of FIG. 11, an element stacked body may be formed by using a plurality of anode foils having different protrusion positions in second region $A_2$ in combination and/or a plurality of cathode foils having different protrusion positions in fourth region $A_4$ in combination. One of the pair of anode foils has second region $A_2$ protruding in a first direction (for example, the normal direction of the first principal surface of the exterior body), but does not have second region $A_2$ protruding in a direction opposite to the first direction (for example, the normal direction of the third principal surface of the exterior body). The other of the pair of anode foils has second region $A_2$ protruding in a direction opposite to the first direction, and does not have second region $A_2$ protruding in the first direction. One of the pair of cathode foils has fourth region $A_4$ protruding in the first direction, but does not have fourth region $A_4$ protruding in a direction opposite to the first direction. The other of the pair of cathode foils has fourth region $A_4$ protruding in a direction opposite to the first direction, and does not have fourth region $A_4$ protruding in the first direction.

Since a pair of anode foils illustrated in Configuration Example 13 and a pair of cathode foils illustrated in Configuration Example 13 match each other when the anode foils and the cathode foils are reversed, the electrolytic capacitor can be realized by preparing a plurality of foil pieces having the same shape.

The pair of anode foils illustrated in Configuration Example 13 and the cathode foil illustrated in Configuration Example 12 may be combined. The pair of cathode foils illustrated in Configuration Example 13 and the anode foil illustrated in Configuration Example 12 may be combined.

In electrolytic capacitor 101, first external electrode 51F disposed on first principal surface 31A faces first external electrode 51G disposed on third principal surface 31C, and second external electrode 52F disposed on first principal surface 31A faces second external electrode 52G disposed on third principal surface 31C. On the other hand, first external electrode 51F disposed on first principal surface 31A may face second external electrode 52G disposed on third principal surface 31C. Second external electrode 52F disposed on first principal surface 31A may face first external electrode 51G disposed on third principal surface 31C.

Figure 12:
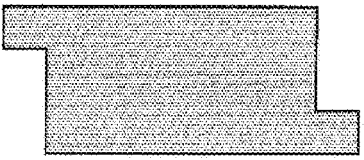
FIG. 12 is a table representing an example of the combination of the anode foil and the cathode foil used in the electrolytic capacitor according to the second exemplary embodiment of the present disclosure.
Figure 12:
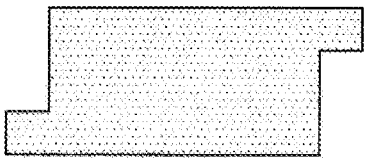
Figure 12:
Figure 12:
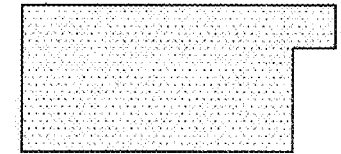

FIG. 12 is a table representing still another example of the combination of the shape of anode foil 10 used in the first step and the shape of cathode foil 20 used in the second step. Similarly to FIG. 11, FIG. 12 illustrates an example of a case where the electrolytic capacitor having four terminals (two anode terminals and two cathode terminals).

Configuration Example 14 illustrated in FIG. 12 is an example of a case where one anode foil and one cathode foil are used.

Similarly to Configuration Example 13 illustrated in FIG. 11, Configuration Example 15 of FIG. 12 is an example of a case where an element stacked body is formed by using a plurality of anode foils having different protrusion positions of second region $A_2$ in combination and/or a plurality of cathode foils having different protrusion positions of fourth region $A_4$ in combination. Since a pair of anode foils illustrated in Configuration Example 15 and a pair of cathode foils illustrated in Configuration Example 15 match each other when the anode foils and the cathode foils are rotated by 180 degrees, the electrolytic capacitor can be realized by preparing a plurality of foil pieces having the same shape.

The pair of anode foils illustrated in Configuration Example 15 and the cathode foil illustrated in Configuration Example 14 may be combined. A pair of cathode foils illustrated in Configuration Example 15 and an anode foil illustrated in Configuration Example 14 may be combined.

Figure 13:
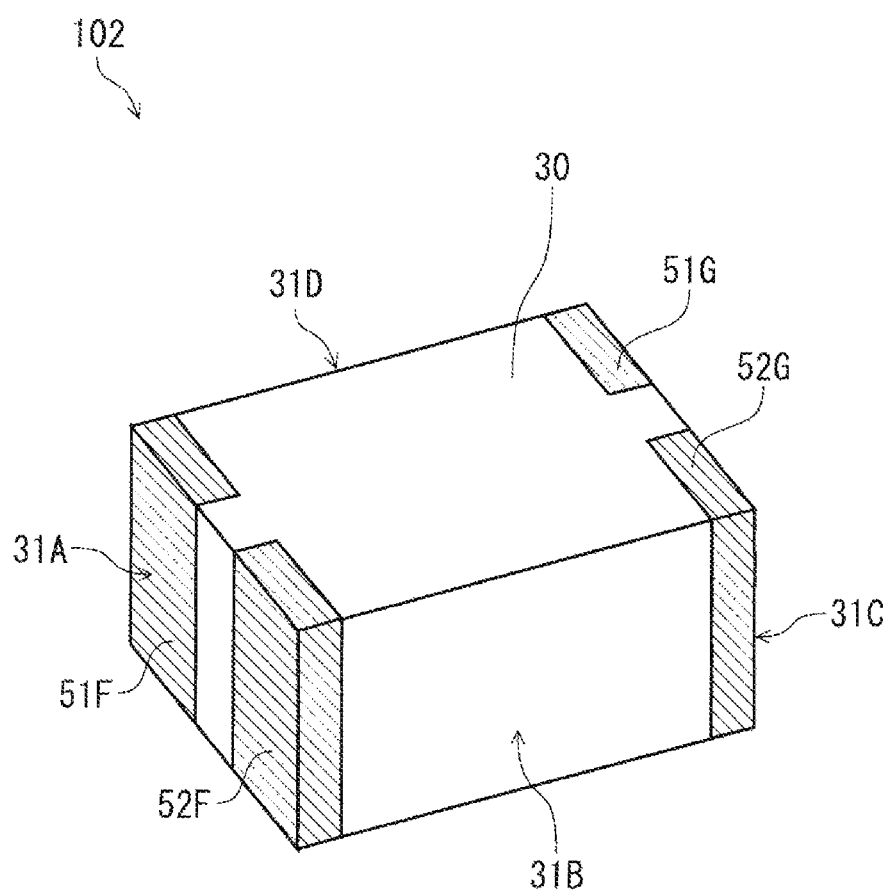
FIG. 13 is a perspective view schematically illustrating another example of the electrolytic capacitor module according to the second exemplary embodiment of the present disclosure.

As illustrated in electrolytic capacitor 102 illustrated in FIG. 13, first external electrode 51F and second external electrode 52F may extend continuously from first principal surface 31A to a part of the principal surface (second principal surface or fourth principal surface) intersecting first principal surface 31A. First external electrode 51G and second external electrode 52G may extend continuously from third principal surface 31C to a part of the principal surface (second principal surface or fourth principal surface) intersecting third principal surface 31C. In this case, the first external electrode may be electrically connected to the end surface of the anode foil on both the first principal surface or the third principal surface on the short side and the second principal surface or the fourth principal surface on the long side. The second external electrode may be electrically connected to the end surface of the cathode foil on both the first principal surface or the third principal surface on the short side and the second principal surface or the fourth principal surface on the long side.

In the electrolytic capacitor of the second exemplary embodiment, other configurations of the electrolytic capacitor, such as configurations of the capacitor element and the element stacked body, are similar to the configurations of the first exemplary embodiment.

The electrolytic capacitor of the present disclosure can be used for various applications in which high capacitance and low ESL are required.

The invention claimed is:

1. An electrolytic capacitor comprising:
   an element stacked body in which a plurality of capacitor elements are stacked;
   an exterior body that seals the element stacked body;
   a plurality of first external electrodes; and
   a plurality of second external electrodes, wherein:
   each of the plurality of capacitor elements includes
      an anode body that is electrically connected to each of the plurality of first external electrodes and has a porous part on a surface of the anode body,
      a dielectric layer that is disposed on a surface of at least a part of the porous part,
      a solid electrolyte layer that covers at least a part of the dielectric layer, and
      a cathode foil electrically connected to the solid electrolyte layer, the cathode foil being electrically connected to each of the plurality of second external electrodes,
   the exterior body has a first principal surface, a second principal surface intersecting the first principal surface, a third principal surface opposite to the first principal surface, and a fourth principal surface opposite to the second principal surface,
   at least two of the plurality of second external electrodes and at least two of the plurality of first external electrodes are disposed along the first principal surface of the exterior body to be separated from each other,
   one of the at least two of the plurality of second external electrodes is interposed between the at least two of the plurality of first external electrodes that are disposed along the first principal surface of the exterior body to be separated from each other,
   at least one of the plurality of first external electrodes is solely disposed along the second principal surface of the exterior body, and none of the plurality of second external electrodes is disposed on the second principal surface of the exterior body,
   at least one of the plurality of second external electrodes is solely disposed along the fourth principal surface of the exterior body, and none of the plurality of first external electrodes is disposed on the fourth principal surface of the exterior body,
   the anode body includes a first anode body and a second anode body that are separated from each other,
   the first anode body is electrically connected to one of the at least two of the plurality of first external electrodes that are disposed on the first principal surface,
   the second anode body is electrically connected to another of the at least two of the plurality of first external electrodes that are disposed on the first principal surface and the at least one of the plurality of first external electrodes that is disposed on the second principal surface,
   the plurality of capacitor elements are stacked in a state where the cathode foil is interposed between adjacent capacitor elements among the plurality of capacitor elements,
   the plurality of capacitor elements include at least one first capacitor element, and
   the anode body in the at least one first capacitor element is electrically connected to the plurality of first external electrodes on at least one of the first principal surface or the third principal surface of the exterior body.

2. The electrolytic capacitor according to claim 1, wherein a distance between the first principal surface and the third principal surface is longer than a distance between the second principal surface and the fourth principal surface.

3. The electrolytic capacitor according to claim 1, wherein a distance between the first principal surface and the third principal surface is shorter than a distance between the second principal surface and the fourth principal surface.

4. The electrolytic capacitor according to claim 1, wherein:
   the anode body has a first region covered with the solid electrolyte layer and a second region protruding from the first region, at least a part of second region being not covered with the solid electrolyte layer, and
   the second region is electrically connected to a corresponding one of the plurality of first external electrodes.

5. The electrolytic capacitor according to claim 1, wherein:
   the cathode foil has a third region facing the solid electrolyte layer and a fourth region protruding from the third region, and
   the fourth region is electrically connected to a corresponding one of the plurality of second external electrodes.

6. The electrolytic capacitor according to claim 1, wherein the cathode foil in the at least one first capacitor element is electrically connected to a corresponding one of the plurality of second external electrodes on at least one of the first principal surface or the third principal surface of the exterior body.

7. The electrolytic capacitor according to claim 1, wherein:
   the plurality of capacitor elements further include at least one second capacitor element,
   the anode body in the at least one first capacitor element is electrically connected to a corresponding one of the plurality of first external electrodes on only the first principal surface among the first principal surface and the third principal surface of the exterior body, and
   the anode body in the at least one second capacitor element is electrically connected to a corresponding one of the plurality of first external electrodes on only the third principal surface among the first principal surface and the third principal surface of the exterior body.

8. The electrolytic capacitor according to claim 7, wherein:
   the cathode foil in the at least one first capacitor element is electrically connected to a corresponding one of the plurality of second external electrodes on only the first principal surface among the first principal surface and the third principal surface of the exterior body, and
   the cathode foil in the at least one second capacitor element is electrically connected to a corresponding one of the plurality of second external electrodes on only the third principal surface among the first principal surface and the third principal surface of the exterior body.

9. The electrolytic capacitor according to claim 7, wherein:
   the cathode foil in the at least one first capacitor element is electrically connected to a corresponding one of the plurality of second external electrodes on only the third principal surface among the first principal surface and the third principal surface of the exterior body, and
   the cathode foil in the at least one second capacitor element is electrically connected to a corresponding one of the plurality of second external electrodes on only the first principal surface among the first principal surface and the third principal surface of the exterior body.

10. The electrolytic capacitor according to claim 7, wherein, in the element stacked body, the at least one first capacitor element and the at least one second capacitor element are alternately stacked.

11. The electrolytic capacitor according to claim 1, wherein the element stacked body is supported on a substrate including a wiring layer on a front surface, and the wiring layer and the solid electrolyte layer are electrically connected.

12. The electrolytic capacitor according to claim 11, wherein:
   a third external electrode is disposed on a back surface of the substrate, and
   the third external electrode is electrically connected to the wiring layer by a via hole.

13. The electrolytic capacitor according to claim 12, wherein the second external electrode is electrically connected to the third external electrode.

* * * * *